United States Patent
Cho et al.

(10) Patent No.: US 10,840,514 B2
(45) Date of Patent: Nov. 17, 2020

(54) AQUEOUS BINDER FOR LITHIUM-SULFUR SECONDARY BATTERY, PREPARATION METHOD THEREOF AND LITHIUM-SULFUR SECONDARY BATTERY COMPRISING THE SAME

(71) Applicant: KOREA INSTITUTE OF SCIENCE AND TECHNOLOGY, Seoul (KR)

(72) Inventors: Won Il Cho, Seoul (KR); Van Dung Do, Seoul (KR); Mun Sek Kim, Seoul (KR); In Wook Nah, Seoul (KR); Min Seop Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 45 days.

(21) Appl. No.: 16/275,563

(22) Filed: Feb. 14, 2019

(65) Prior Publication Data

US 2020/0119355 A1   Apr. 16, 2020

(30) Foreign Application Priority Data

Oct. 15, 2018 (KR) .......................... 10-2018-0122517

(51) Int. Cl.
*H01M 4/62* (2006.01)
*H01M 4/36* (2006.01)
*H01M 4/38* (2006.01)
*H01M 10/052* (2010.01)
*H01M 4/587* (2010.01)
*H01M 4/02* (2006.01)

(52) U.S. Cl.
CPC .......... *H01M 4/622* (2013.01); *H01M 4/364* (2013.01); *H01M 4/382* (2013.01); *H01M 4/587* (2013.01); *H01M 10/052* (2013.01); *H01M 2004/028* (2013.01)

(58) Field of Classification Search
CPC ...... H01M 4/364; H01M 4/382; H01M 4/621; H01M 4/622; H01M 4/587; H01M 10/052; H01M 2004/028
See application file for complete search history.

(56) References Cited

FOREIGN PATENT DOCUMENTS

| JP | 09-180725 A | 7/1997 |
| KR | 10-2018-0017796 A | 2/2018 |

OTHER PUBLICATIONS

Matthew J. Lacey et al., "Functional, water-soluble binders for improved capacity and stability of lithium-sulfur batteries", Journal of Power Sources, 2014, pp. 8-14, vol. 264.

Yongju Jung et al., "New approaches to improve cycle life characteristics of lithium-sulfur cells", Electrochemistry Communications, 2007, pp. 249-254, vol. 9.

*Primary Examiner* — Gregg Cantelmo
(74) *Attorney, Agent, or Firm* — Rabin & Berdo, P.C.

(57) ABSTRACT

The present disclosure relates to an aqueous binder for a lithium-sulfur secondary battery, a method for preparing the same, and a lithium-sulfur secondary battery including the same. More particularly, it is possible to obtain an aqueous binder (PEI/PVP/CA, PPC) by adding citric acid to a mixed solution of polyethylene imine with polyvinyl pyrrolidone, and to apply the aqueous binder to a lithium-sulfur secondary battery having high discharge capacity, Coulombic efficiency and stable life characteristics through the improvement of adhesion capability even at a sulfur cathode with high energy density, inhibition of a shuttle reaction and inhibition of metal current collector corrosion.

9 Claims, 20 Drawing Sheets

| Main agent | Binders | State | State with CA | Pictures |
|---|---|---|---|---|
| PEI | PVP | Soluble | Suspension |  |
| PEI | PEO | Soluble | Insoluble |  |
| PEI | PAA | Insoluble | X |  |
| PEI | CMC | Soluble | Insoluble |  |
| PEI | SBR | Soluble | Insoluble |  |

— # AQUEOUS BINDER FOR LITHIUM-SULFUR SECONDARY BATTERY, PREPARATION METHOD THEREOF AND LITHIUM-SULFUR SECONDARY BATTERY COMPRISING THE SAME

CROSS-REFERENCE TO RELATED APPLICATIONS

This application claims priority under 35 U.S.C. § 119 to Korean Patent Application No. 10-2018-0122517 filed on Oct. 15, 2018 in the Korean Intellectual Property Office, the disclosure of which is incorporated herein by reference in its entirety.

TECHNICAL FIELD

The following disclosure relates to an aqueous binder for a lithium-sulfur secondary battery, a method for preparing the same and a lithium-sulfur secondary battery including the same. More particularly, the following disclosure relates to an aqueous binder (PEI/PVP/CA, PPC) prepared by adding citric acid to a mixed solution of polyethylene imine with polyvinyl pyrrolidone, and to application thereof to a lithium-sulfur secondary battery having high discharge capacity, Coulombic efficiency and stable life characteristics through the improvement of adhesion capability even in a sulfur cathode with high energy density, inhibition of a shuttle reaction and inhibition of metal current collector corrosion.

BACKGROUND

Lithium ion secondary batteries were commercialized by the Sony Company (Japan) in 1991. Then, since 1990's, such a lithium ion secondary battery has become an essential part of portable electronic instruments. Particularly, as the portable electronic instruments, such as smart phones, digital cameras or notebook computers, have been increasingly in use, the market and importance of lithium ion secondary batteries have grown more and more. The market and importance of such lithium ion secondary batteries have been grown continuously and the application spectrum thereof has been extended to electric vehicles (EV) and energy storage systems more recently. Thus, importance of lithium ion secondary batteries has further increased.

However, in the commercially available lithium ion secondary battery systems, there is an immanent limitation in satisfying an increasing need of consumers to the current compact battery systems and a need in the near future market of electric vehicles and large-capacity energy storage systems. The immanent limitation is low capacity. The existing lithium ion secondary battery includes a transition metal oxide cathode having a capacity of ~270 mAh/g and a graphite anode having a capacity of ~372 mAh/g. When such a secondary battery having low capacity derived from simple intercalaction/deintercalation is applied to electric vehicles, the vehicle-mile per charging is too small to overcome the existing vehicle market.

A lithium-sulfur battery is a leader of the next-generation secondary batteries which overcome the limitation of low capacity of the existing lithium ion secondary battery. The lithium-sulfur secondary battery is a system which uses sulfur as an active material for electrochemical reaction and has a high theoretical capacity of ~1,675 mAh/g. It uses lithium metal having a theoretical capacity of ~3,860 mAh/g as an anode and shows an energy density of about 2,600 Wh/kg, which is approximately 7-8 times of the energy density (~400 Wh/kg) of the existing lithium ion secondary battery ($LiCoO_2$/graphite) system. Although such potential of lithium-sulfur secondary batteries have been already disclosed in 1960's, active studies thereof have not been conducted to date due to several difficulties. However, in 2009, it was reported that Linda F. Nazar group (Canada) prepared a composite of mesoporous carbon with sulfur to improve the characteristics of lithium-sulfur batteries. This leads to active studies about lithium-sulfur secondary batteries all over the world.

Despite such advantages, there are still problems to be solved in order to commercialize lithium-sulfur secondary batteries. The first problem is significantly low electric conductivity of sulfur used as an active material. Sulfur has an electric conductivity of $5 \times 10^{-30}$ S/cm, which suggests that it is substantially an electrical insulator. In addition, the final discharging material, $Li_2S$, is an electrical insulator. Therefore, a conductive material capable of providing an electron path is essentially required. The second problem is volumetric swelling of sulfur occurring between charging and discharging. The active material, sulfur ($S_8$), and the final discharging material, $Li_2S$, have a density of 2.07 $g/cm^3$ and 1.66 $g/cm^3$, respectively, and the difference in volume between them is about 80%. To solve the problem of electrode stability caused by such volumetric swelling, the conductive material used for the lithium-sulfur secondary battery should provide an electrical path and should reduce volumetric swelling at the same time. The third problem is a phenomenon, known as so-called 'shuttle reaction'. Among the polysulfide species as reaction intermediates produced during discharging, $Li_2Sn$ ($4 \leq n \leq 8$) of a long chain polysulfide type is dissolved well in an ether-based electrolyte. Thus, the polysulfide species dissolved in the electrolyte passes through a separator from a cathode, is diffused and transported to a lithium metal anode, and causes a chemical side reaction with the lithium metal anode. Therefore, a serious problem, such as loss of the active material in the cathode or degradation of the surface state of the lithium metal anode, occurs to cause degradation of the life characteristics of a lithium-sulfur secondary battery. Recently, in order to inhibit the problems caused by the shuttle reaction, various attempts have been made to develop a carbon structure for a cathode, to carry out surface coating on a separator, to develop an electrolyte, and thus to prevent diffusion of polysulfide. However, most of such attempts include test results showing a potential based on a cathode having low energy density. In the future, the problems, including the shuttle reaction, may occur more seriously under the condition of an actual high-energy density cathode for realizing the best advantage of a lithium-sulfur secondary battery.

Therefore, the present inventors have found that an aqueous binder (PEI/PVP/CA, PPC) can be prepared by adding citric acid to a mixed solution of polyethylene imine with polyvinyl pyrrolidone, and the aqueous binder can be applied to a lithium-sulfur secondary battery having high discharge capacity, Coulombic efficiency and stable life characteristics through the improvement of adhesion capability even at a sulfur cathode with high energy density, inhibition of a shuttle reaction and inhibition of metal current collector corrosion. The present disclosure is based on this finding.

REFERENCES

Non-Patent Documents

Non-Patent Document 1. Jung, Yongju, and Seok Kim. *Electrochemistry Communications* 9.2 (2007): 249-254.

SUMMARY

The present disclosure is designed to solve the problems of the related art, and an embodiment of the present disclosure is directed to providing an aqueous binder (PEI/PVP/CA, PPC) prepared by adding citric acid to a mixed solution of polyethylene imine with polyvinyl pyrrolidone, and to applying the aqueous binder to a lithium-sulfur secondary battery having high discharge capacity, Coulombic efficiency and stable life characteristics through the improvement of adhesion capability even in a sulfur cathode with high energy density, inhibition of a shuttle reaction and inhibition of metal current collector corrosion.

In one aspect of the present disclosure, there is provided an aqueous binder for a lithium-sulfur battery, including polyethylene imine, polyvinyl pyrrolidone and citric acid.

In another aspect of the present disclosure, there is provided a sulfur cathode material for a lithium-sulfur secondary battery, including the aqueous binder for a lithium-sulfur secondary battery according to the present disclosure, a sulfur-carbon composite and a conductive material.

In still another aspect of the present disclosure, there is provided a lithium-sulfur secondary battery which includes a cathode including the cathode material for a lithium-sulfur secondary battery according to the present disclosure, a lithium metal anode, a separator and an electrolyte.

In still another aspect of the present disclosure, there is provided a method for an aqueous binder for a lithium-sulfur secondary battery which includes the steps of: (a) mixing a polyethylene imine solution with a polyvinyl pyrrolidone solution, and (b) adding a citric acid solution to the mixed solution.

In yet another embodiment of the present disclosure, there is provided a method for preparing a sulfur-carbon composite for a sulfur cathode material of a lithium-sulfur secondary battery, which includes the steps of: (A) heat treating mixed powder of sulfur with carbon to obtain sulfur-carbon composite powder; (B) introducing the sulfur-carbon composite powder to distilled water and washing it through ultrasonication; and (C) introducing the sulfur-carbon composite powder washed with distilled water to ethanol and washing it through ultrasonication.

According to the present disclosure, it is possible to obtain an aqueous binder (PEI/PVP/CA, PPC) by adding citric acid to a mixed solution of polyethylene imine with polyvinyl pyrrolidone, and to apply the aqueous binder to a lithium-sulfur secondary battery having high discharge capacity, Coulombic efficiency and stable life characteristics through the improvement of adhesion capability even at a sulfur cathode with high energy density, inhibition of a shuttle reaction and inhibition of metal current collector corrosion.

DETAILED DESCRIPTION OF EMBODIMENTS

Figure 1:
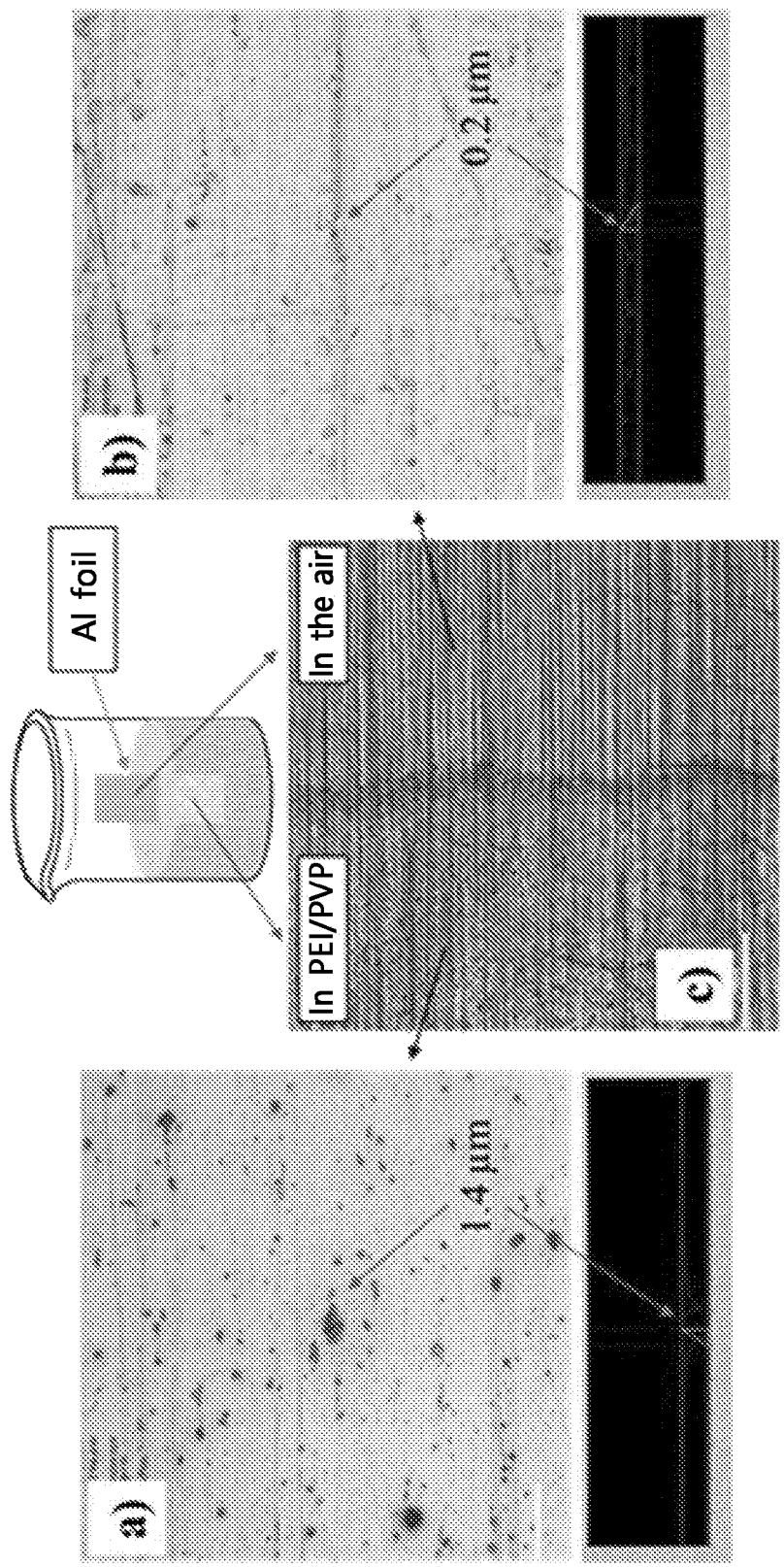
FIG. 1 shows an image illustrating an aluminum corrosion phenomenon occurring when an aluminum foil current collector used as a cathode current collector for a cathode of a lithium-sulfur secondary battery is dipped in the PEI/PVP binder solution prepared from Comparative Example 1, as observed visually through a laser optical microscope.

According to the related art, a lithium-sulfur secondary battery using a thin electrode having low energy density is provided with high battery characteristics through the development of various cathode materials or modification of a separator. However, in order to overcome the limitation of the commercially available lithium ion secondary battery, it is required for a lithium-sulfur secondary battery to use a high-energy density cathode. As the proportion of a sulfur active material is increased in the ingredients of a cathode or the thickness of a cathode is increased in order to develop a high-density cathode, the loading amount of sulfur in the cathode is increased significantly, and thus the immanent problem of the lithium-sulfur secondary battery occurs again and is hardly controlled. Particularly, the absolute dissolution amount of polysulfide causing the shuttle reaction is increased significantly. When this is not controlled suitably, the active material in the cathode is lost and a lithium anode is corroded, resulting in rapid degradation of the Coulombic efficiency and life of the battery. According to the present disclosure, a novel aqueous binder is developed, and thus it is possible to improve adhesion ability, to inhibit the shuttle reaction and to inhibit the corrosion of a metal current collector. Ultimately, it is possible to solve the problems occurring upon the manufacture of a high sulfur loading cathode.

Hereinafter, various aspects and embodiments of the present disclosure will be explained in more detail.

In one aspect, there is provided an aqueous binder for a lithium-sulfur secondary battery, including polyethylene imine (PEI), polyvinyl pyrrolidone (PVP) and citric acid (CA).

According to the present disclosure, it is possible to significantly improve the instability of a cathode, such as cracking on the surface of an electrode or corrosion of a current collector, occurring when the conventional organic PVdF binder or various aqueous binders (PAA, PEI/PVP, PEO/PVP, CMC/SBR, or the like) are applied to a cathode material for a lithium-sulfur secondary battery. Since PEI, which contributes to solving the problem related with the shuttle reaction of a lithium-sulfur secondary battery, has high adhesive property, it may function as a good aqueous binder through the combination with PVP. However, in this case, a problem is generated due to the corrosion of a current collector caused by strong basic property of PEI. According to the present disclosure, citric acid is used to neutralize an aqueous binder, thereby solving the problem of corrosion.

In addition, the aqueous binder according to the present disclosure improves viscosity, adhesive property and a property of preventing a current collector form corrosion, and thus it allows manufacture of a stable high sulfur loading cathode even in a small amount. Further, it is possible to ensure high discharge capacity and Coulombic efficiency and stable life characteristics even in a high sulfur loading cathode through the development of such an aqueous binder.

According to an embodiment, polyethylene imine, polyvinyl pyrrolidone and citric acid may be used at a weight ratio of 1:5.5-6.5:0.25-2, preferably 1:5.6-6.4:0.5-1.5, and more preferably 1:5.8-6.2:0.8-1.2.

It is shown that the aqueous binder has characteristics of a neutral state (pH 7) within the above-defined range of 1:5.5-6.5:0.25-2. Specifically, it is shown that when using the aqueous binder within the above-defined weight ratio of 1:5.5-6.5:0.25-2, no leakage of sulfur occurs to the outside of the electrode of a battery even at a high temperature (60-80° C. or more) higher than the melting temperature of sulfur. On the contrary, it is shown that when using the aqueous binder beyond the above-defined weight ratio of 1:5.5-6.5:0.25-2, significant leakage of sulfur occurs to the outside of the electrode.

In addition, within the more preferred weight ratio range (1:5.8-6.2:0.8-1.2), the aqueous binder shows significantly higher electrochemical rate capability, and has a high tensile stress of 35 MPa at room temperature, and thus shows higher adhesive property as compared to the other binders.

According to another embodiment, the aqueous binder may further include polyethylene oxide. When manufacturing a high sulfur loading cathode for the purpose of densification of a sulfur cathode, crumbling and separation of an electrode material occur at the folded portion of the electrode. When the aqueous binder further includes polyethylene oxide as mentioned above, brittleness of the high sulfur loading cathode is reduced. Thus, it is possible to manufacture a flexible electrode which causes no crumbling and separation of the electrode material even at the folded portion of the electrode.

According to still another embodiment, polyethylene imine, polyvinyl pyrrolidone, citric acid and polyethylene oxide may be used at a weight ratio of 1:4-6:0.25-1:0.5-2.5, preferably 1:4-5:0.5-1:1-2.5, and more preferably 1:4-4.2:0.8-1:1.8-2.2.

Specifically, when the weight ratio is beyond the above-defined range of 1:4-6:0.25-1:0.5-2.5, precipitate of the binder is formed with the lapse of time to cause deformation.

According to still another embodiment, the NMR spectrum may have peaks in a range of 3.0-3.25 ppm and 2.70-3.1 ppm. As citric acid and PEO are added sequentially to the PEI/PVP binder, new peaks appear. This suggests that a polymer binder having a novel structure is formed.

In another aspect, there is provided a sulfur cathode material for a lithium-sulfur secondary battery, including the aqueous binder for a lithium-sulfur secondary battery according to the present disclosure, a sulfur-carbon composite and a conductive material.

According to an embodiment, the sulfur cathode material for a lithium-sulfur secondary battery may have controlled viscosity by adding a solvent containing distilled water and ethanol at a weight ratio of 1:0.1-2, preferably 0.5-1.5, and more preferably 0.8-1.2 to slurry containing the aqueous binder for a lithium-sulfur secondary battery according to the present disclosure, a sulfur-carbon composite and a conductive material.

According to another embodiment, the aqueous binder for a lithium-sulfur secondary battery may be used in an amount of 1-20 parts by weight, preferably 2-10 parts by weight, and more preferably 4-6 parts by weight, based on 100 parts by weight of the sulfur cathode material.

When the amount of the aqueous binder is less than 1 part by weight, it is difficult to manufacture a cathode. When the amount of the aqueous binder is larger than 20 parts by weight, the sulfur loading amount is decreased to cause degradation of the capacity of the secondary battery.

In still another aspect, there is provided a lithium-sulfur secondary battery which includes a cathode including the cathode material for a lithium-sulfur secondary battery according to the present disclosure, a lithium metal anode, a separator and an electrolyte.

Particularly, although there is no clear description in the following Examples and Comparative Examples, after each of the lithium-sulfur secondary batteries having a different composition of the aqueous binder for a lithium-sulfur secondary battery, a different amount of the aqueous binder in the sulfur cathode material, and different types of sulfur-carbon composite, conductive materials, separators and electrolytes is operated at high temperature (60° C.) for 500 hours, each of the cathodes of the lithium-sulfur secondary batteries was observed through the scanning electron microscopy (SEM) of its section.

As a result, unlike the other conditions and the other numerical ranges, when all of the following conditions are satisfied, no agglomeration of the binder occurs even after the lithium-sulfur secondary battery is operated at high temperature for 500 hours, and no loss of the conductive material is observed so that excellent thermal stability may be demonstrated:

(i) the aqueous binder for a lithium-sulfur secondary battery includes polyethylene imine, polyvinyl pyrrolidone and citric acid at a weight ratio of 1:5.8-6.2:0.8-1.2; (ii) the aqueous binder for a lithium-sulfur secondary battery is used in an amount of 4-6 parts by weight based on 100 parts by weight of the sulfur cathode material; (iii) the sulfur-carbon composite is a composite of sulfur/multi-walled carbon nanotubes; and (iv) the electrolyte is a solution containing 0.8-1.2M of LiTFSI as a lithium salt and 0.1-0.5M of $LiNO_3$ as an additive, dissolved in a solvent containing dimethoxyethane (DEM) and dioxolane (DOL) at a volume ratio of 1:0.8-1.2.

On the contrary, when any one of the above-mentioned conditions is not satisfied, significant agglomeration of the binder occurs after the secondary battery is operated at high temperature for 500 hours, and a significant loss of the conductive material is observed.

In still another aspect, there is provided a method for an aqueous binder for a lithium-sulfur secondary battery which includes the steps of: (a) mixing a polyethylene imine solution with a polyvinyl pyrrolidone solution, and (b) adding a citric acid solution to the mixed solution.

Specifically, when the mixing order is changed so that polyethylene imine is mixed with citric acid first, it is not possible to obtain an aqueous binder due to the formation of precipitate. Thus, it is shown that the above-described mixing order is important significantly.

According to an embodiment, the method may further include step (c) of further adding a polyethylene oxide solution, after step (a). As described above, when polyethylene oxide is further added, brittleness of a high sulfur loading cathode is reduced, and thus crumbling and separation of an electrode material are not observed. Thus, it is possible to obtain a flexible electrode.

According to another embodiment, the mixing in step (a) may be carried out through agitation for 10-30 hours, preferably 18-30 hours, and more preferably 24-30 hours.

Particularly, step (a) is a physicochemical reaction step of polyethylene imine with polyvinyl pyrrolidone, and step (b) is a neutralization step through the addition of citric acid.

When the agitation time is less than 10 hours, viscosity is decreased significantly to cause degradation of adhesion of the aqueous binder. When the agitation time is more than 30 hours, the viscosity level is saturated by the physicochemical interaction between polyethylene imine and polyvinyl pyrrolidone, which suggests that the agitation is carried out more than needs.

In yet another aspect, there is provided a method for preparing a sulfur-carbon composite for a sulfur cathode material of a lithium-sulfur secondary battery, which includes the steps of: (A) heat treating mixed powder of sulfur with carbon to obtain sulfur-carbon composite powder; (B) introducing the sulfur-carbon composite powder to distilled water and washing it through ultrasonication; and (C) introducing the sulfur-carbon composite powder washed with distilled water to ethanol and washing it through ultrasonication.

In the method for preparing a sulfur-carbon composite, two-step washing is carried out with distilled water and ethanol. When a sulfur-carbon composite not subjected to the two-step washing is used as a cathode material and casting and drying are carried out on an aluminum current collector, it is shown that small holes are generated on the electrode surface due to the corrosion of the aluminum current collector. It is thought that this is because a small amount of gas, such as hydrogen disulfide ($H_2S$) or sulfur dioxide ($SO_2$), generated at the cathode material prepared by using the sulfur-carbon composite not subjected to the two-step washing, shows acidic property when dissolved in water. Such acidic materials cause corrosion of an aluminum current collector during the casting and high-temperature drying. However, when washing steps are introduced according to the present disclosure, it is possible to prevent the above-mentioned problem.

According to an embodiment, sulfur and carbon may be mixed at a weight ratio of 1:0.1-0.5, preferably 1:0.2-0.3.

According to another embodiment, the carbon may be at least one selected from multi-walled carbon nanotubes, single walled carbon nanotubes, Ketjen black, Super-P, vapor grown carbon nanofibers (VGCF) and reduced GO (rGO), but is not limited thereto. Preferably, multi-walled carbon nanotubes are used.

According to another embodiment, the heat treatment may be carried out at 100-200° C., 120-180° C., and more preferably 150-160° C.

According to still another embodiment, step (B) may be carried out once to 10 times, preferably twice to 8 times, and more preferably 3 to 4 times.

The examples and experiments will now be described. The following examples and experiments are for illustrative purposes only and not intended to limit the scope of this disclosure. In addition, it will be apparent to those skilled in the art that various changes and modifications may be made based on the disclosure of the present invention including the following examples, and the changes and modifications are also within the scope of the present disclosure as defined in the following claims.

In addition, the following test results merely include typical test examples of examples and comparative examples, and the effects of various embodiments not specified in the following description are described in the corresponding part.

Example 1: Synthesis of PPC (1/6/0.25) Binder (PEI/PVP/CA Binder)

An aqueous solution of 50 wt % of branched polyethylene imine (PEI, average molecular weight: 750,000 g/mol) dissolved in distilled water, polyvinyl pyrrolidone (PVP) having an average molecular weight of 360,000 g/mol and citric acid (CA) having a purity of 99.5% were used for synthesis.

First, 12 g of PVP was dissolved in 218 g of distilled water through agitation at a speed of 500 rpm for 12-24 hours. Next, 4 g of the aqueous PEI solution was dissolved in 36 g of distilled water through agitation at a speed of 500 rpm for 1-12 hours and the resultant solution was further added to the PVP solution, followed by mixing through agitation for 12-42 hours. Then, a solution containing 0.5 g of citric acid dissolved in 19.5 g of distilled water was further introduced thereto, followed by mixing through agitation for 3-9 hours. Finally, a PPC (1/6/0.25) binder including 5 parts by weight of PPC having a weight ratio of PEI/PVP/citric acid of 1/6/0.25, based on 100 parts by weight of the solution, was obtained.

Example 2: Synthesis of PPC (1/6/0.5) Binder (PEI/PVP/CA Binder)

A PPC (1/6/0.5) binder including 5 parts by weight of PPC having a weight ratio of PEI/PVP/citric acid of 1/6/0.5, based on 100 parts by weight of the solution, was obtained in the same manner as the synthesis method for the PPC (1/6/0.25) binder according to Example 1, except that 1 g of citric acid and 29 g of distilled water were used to prepare the aqueous citric acid solution.

Example 3: Synthesis of PPC (1/6/1) Binder (PEI/PVP/CA Binder)

A PPC (1/6/1) binder including 5 parts by weight of PPC having a weight ratio of PEI/PVP/citric acid of 1/6/1, based on 100 parts by weight of the solution, was obtained in the same manner as the synthesis method for the PPC (1/6/0.25) binder according to Example 1, except that 2 g of citric acid and 48 g of distilled water were used to prepare the aqueous citric acid solution.

Example 4: Synthesis of PPC (1/6/2) Binder (PEI/PVP/CA Binder)

A PPC (1/6/2) binder including 5 parts by weight of PPC having a weight ratio of PEI/PVP/citric acid of 1/6/2, based on 100 parts by weight of the solution, was obtained in the same manner as the synthesis method for the PPC (1/6/0.25) binder according to Example 1, except that 4 g of citric acid and 86 g of distilled water were used to prepare the aqueous citric acid solution.

Example 5: Synthesis of PPCP (1/4/1/2) Binder (PEI/PVP/CA/PEO Binder)

An aqueous solution of 50 wt % of branched polyethylene imine (PEI, average molecular weight: 750,000 g/mol) dissolved in distilled water, polyvinyl pyrrolidone (PVP) having an average molecular weight of 360,000 g/mol, citric acid (CA) having a purity of 99.5% and polyethylene oxide having an average molecular weight of 1,000,000 g/mol were used for synthesis.

First, 12 g of PVP was dissolved in 188 g of distilled water through agitation at a speed of 500 rpm for 12-24 hours. Next, 6 g of the aqueous PEI solution was dissolved in 34 g of distilled water through agitation at a speed of 500 rpm for 1-12 hours and the resultant solution was further added to the PVP solution, followed by mixing through agitation for 12-42 hours. Then, and a solution 6 g of PEO dissolved in 214 g of distilled water was further introduced thereto, followed by mixing through agitation for 6-18 hours. A solution containing 3 g of citric acid dissolved in 17 g of distilled water was further introduced thereto, followed by mixing through agitation for 3-9 hours. Finally, a PPCP (1/4/1/2) binder including 5 parts by weight of PPCP having a weight ratio of PEI/PVP/citric acid/PEO of 1/4/1/2, based on 100 parts by weight of the solution, was obtained.

Example 6: Synthesis of Sulfur/Multi-walled Carbon Nanotubes (4/1) Composite (S/MWCNT Composite)

First, 16 g of sulfur powder having a purity of 99.98% was mixed sufficiently with 4 g of multi-walled carbon nanotubes by using a mortar for 30 minutes, and heat treatment was carried out in a vacuum oven at 155° C. for 10 hours. Next, the S/MWCNT composite was washed three times by using distilled water and ultrasonication, wherein the last time of washing was carried out by using ethanol instead of distilled water. Then, the resultant product was dried in an oven at 80° C. for 24-48 hours to obtain S/MWCNT (4/1) composite powder for a sulfur cathode with high energy density.

Example 7: Manufacture of Sulfur Cathode with High Energy Density

First, 1.6 g of the S/MWCNT (4/1) composite obtained from Example 6, 0.32 g of Super-P as a conductive material and an aqueous solution containing 5 parts by weight (0.08 g) of a binder based on 100 parts by weight of the aqueous solution (distilled water) were introduced to carry out ball milling, thereby providing slurry. Herein, the binder includes each of the binders obtained from Examples 1-5 and Comparative Examples 1-6. In addition, 0.5 g of distilled water and 0.5 g of ethanol were added during the ball milling in order to control the viscosity of the finished slurry. The slurry was cast onto an aluminum foil current collector and dried in a vacuum oven at 60° C. for 10-15 hours. Finally, a high-energy density (high loading) sulfur cathode having a weight ratio of S/MWCNT:Super-P:binder of 80:16:4 and a sulfur loading amount of 3-4.5 mg/cm$^2$ was obtained.

Example 8: Manufacture of Lithium-Sulfur Secondary Battery

The high-energy density sulfur cathode according to Example 7, a lithium metal foil anode, and Celgard 2500™ separator (Nafion-coated polypropylene separator) were used. A solution containing 1M LiTFSI as a lithium salt and 0.25M LiNO$_3$ as an additive in a mixed solvent of DME:DOL (volume ratio 1:1) was used as an electrolyte to manufacture a coin cell. The battery was a type of 2032 coin cell. A Marker 4000 series charging/discharging apparatus was used and life characteristics were determined in a voltage range of 1.7-2.6 V (Li/Li$^+$) at a current density of 1 C. Herein, 1 C=1,675 mAh/g.

Comparative Example 1: Synthesis of PEI/PVP (1/6) Binder

A PEI/PVP (1/6) binder including 5 parts by weight of PEI/PVP dissolved in 100 parts by weight of the solution was obtained in the same manner as the synthesis method for the PPC (1/6/0.25) binder according to Example 1, except that citric acid was not added.

Comparative Example 2: Synthesis of PVP/PEO (3/2) Binder

First, 6 g of polyethylene oxide (PEO) was dissolved in 285 g of distilled water through agitation at a speed of 500 rpm for 12 hours. Then, 9 g of PVP was introduced thereto and dissolved through agitation for 12 hours to obtain a PVP/PEO (3/2) binder including 5 parts by weight of PVP/PEO dissolved in 100 parts by weight of the solution.

Comparative Example 3: Synthesis of CMC/SBR (1/1) Binder

First, 7 g of carboxymethyl cellulose (CMC) was dissolved in 255.5 g of distilled water through agitation at a speed of 500 rpm for 12 hours. Then, 17.5 g of aqueous solution of 40 wt % styrene butadiene rubber (SBR) dissolved in distilled water was introduced thereto and dissolved completely through agitation for 6 hours to obtain a CMC/SBR (1/1) binder including 5 parts by weight of CMC/SBR dissolved in 100 parts by weight of the solution.

Comparative Example 4: Synthesis of PAA Binder

A PAA binder including 5 parts by weight of PAA dissolved in 100 parts by weight of the solution was obtained by dissolving 40 g aqueous solution of 35 wt % polyacrylic acid (PAA) dissolved in distilled water was introduced to 240 g of distilled water and dissolved through agitation at a speed of 500 rpm for 6 hours.

Comparative Example 5: Synthesis of PVdF Binder

A PVdF binder including 5 parts by weight of PVdF dissolved in 100 parts by weight of the solution was obtained by dissolving 12 g of polyvinylidene difluoride (PVdF) into 228 g of N-methyl-2-pyrrolidone (NMP) through agitation at a speed of 500 rpm for 48 hours.

Comparative Example 6: Synthesis of PEI Binder

A PEI binder including 5 parts by weight of PEI dissolved in 100 parts by weight of the solution was obtained by dissolving 12 g of aqueous solution of 50 wt % of polyethylene imine (PEI) in distilled water into 108 g of distilled water through agitation at a speed of 500 rpm for 6 hours.

FIG. 1 shows an image illustrating an aluminum corrosion phenomenon occurring when an aluminum foil current collector used as a cathode current collector for a cathode of a lithium-sulfur secondary battery is dipped in the PEI/PVP binder solution prepared from Comparative Example 1, as observed visually through a laser optical microscope.

Referring to FIG. 1, (c) directly shows the difference between the portion dipped in the PEI/PVP binder and the non-dipped portion, and each portion is shown in (a) and (b) in the form of an enlarged view. As can be seen from the left side (a), holes with a depth of about 1.4 μm were generated in the surface of the aluminum foil current collector dipped in the PEI/PVP solution due to the corrosion of aluminum. Such pit corrosion of the aluminum current collector results from the strong basicity of the PEI/PVP binder solution which shows a pH ranging from 10 to 12 due to PEI.

Figure 2:
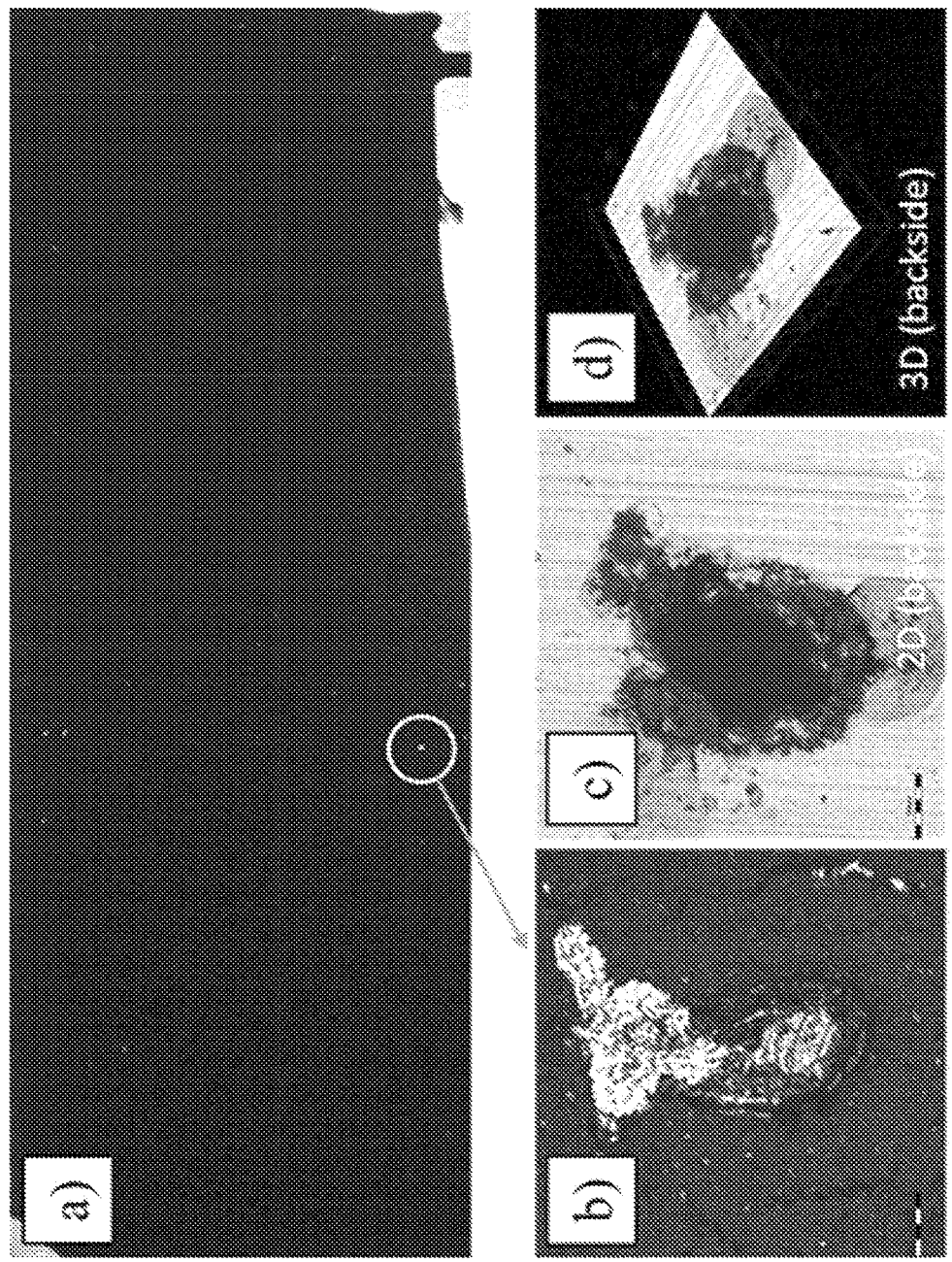
FIG. 2 shows an image of a cathode for an actual lithium-sulfur secondary battery obtained by using the PEI/PVP binder prepared from Comparative Example 1, after drying it in an oven at 60° C., as observed through a three-dimensional laser optical microscope.

FIG. 2 shows an image of a cathode for an actual lithium-sulfur second battery obtained by using the PEI/PVP binder prepared from Comparative Example 1, after drying it in an oven at 60° C., as observed through a three-dimensional laser optical microscope.

Referring to FIG. 2, the whole electrode of image (a) shows many white holes and a portion thereof is shown in (b) in the form of an enlarged view. In addition, (c) and (d) illustrate the results of two-dimensional and three-dimensional observation of the back surface of the portion. It can be seen from the results that the aluminum foil with a depth of 15 μm is etched totally and holes having a diameter of about 150 μm or more are formed. It is thought that pit corrosion of aluminum occurs more severely due to the PEI/PVP binder solution during the drying at a high temperature of 60° C.

Figure 3:
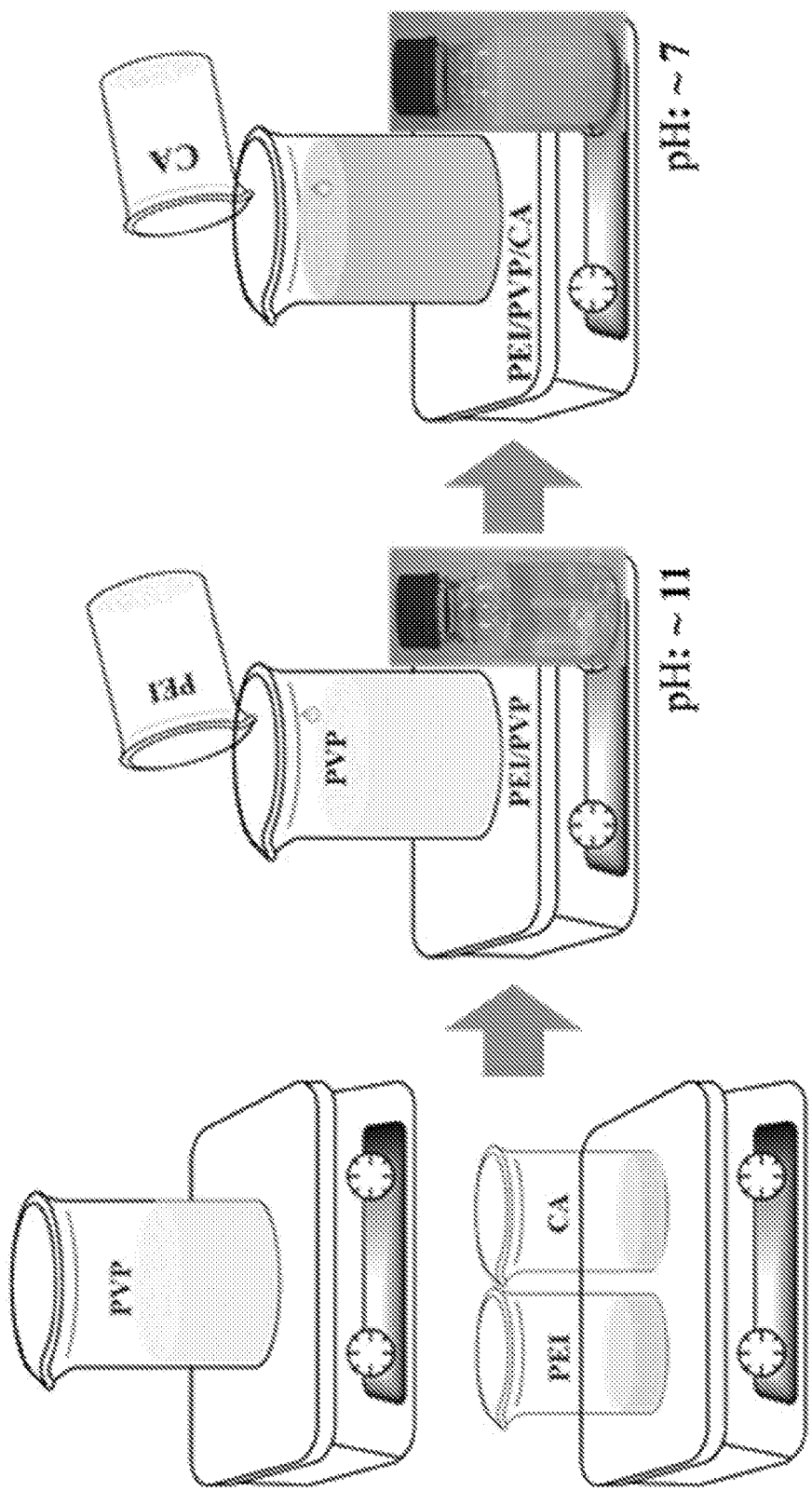
FIG. 3 is a schematic view illustrating the methods for preparing the PPC binders according to Examples 1-4.

FIG. 3 is a schematic view illustrating the methods for preparing the PPC binders according to Examples 1-4.

Referring to FIG. 3, PVP is introduced to distilled water first and dissolved therein at a speed of 500 rpm at room temperature for 12-24 hours. To the resultant solution, a solution containing PEI dissolved in distilled water at 500 rpm for 1-12 hours is added, followed by agitation for 12-42 hours. After the completion of the agitation, the produce is in a clear liquid state having a pH of about 11. Then, a solution of citric acid in distilled water is added, followed by further agitation for 3-9 hours. After the completion of the reaction, the solution is in a neutral state with a pH of about 7 and is converted into an opaque milky white liquid solution, thereby providing a PPC binder.

Figure 4:
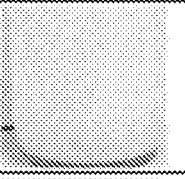
FIG. 4 shows the results of compatibility of PEI, various aqueous binder materials and citric acid, wherein the compatibility is observed by adding PEI and each of PVP, PEO, PAA, CMC and SBR binders and further adding citric acid thereto.
Figure 4:
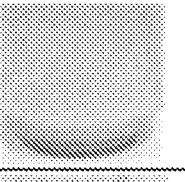
Figure 4:
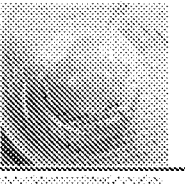
Figure 4:
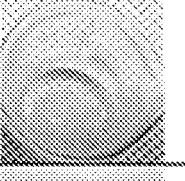
Figure 4:
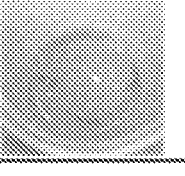

FIG. 4 shows the results of compatibility of PEI, various aqueous binder materials and citric acid, wherein the compatibility is observed by adding PEI and each of PVP, PEO, PAA, CMC and SBR binders and further adding citric acid thereto.

Referring to FIG. 4, except PEI and PAA, two binders in all cases are mixed well with each other to form a miscible solution. However, when citric acid is further added, such a solution sate is maintained merely in the PEI/PVP combination and the other combinations are insoluble. Therefore, it can be seen that only the combination of PEI, PVP and citric acid is a binder system capable of maintaining a solution state.

Figure 5:
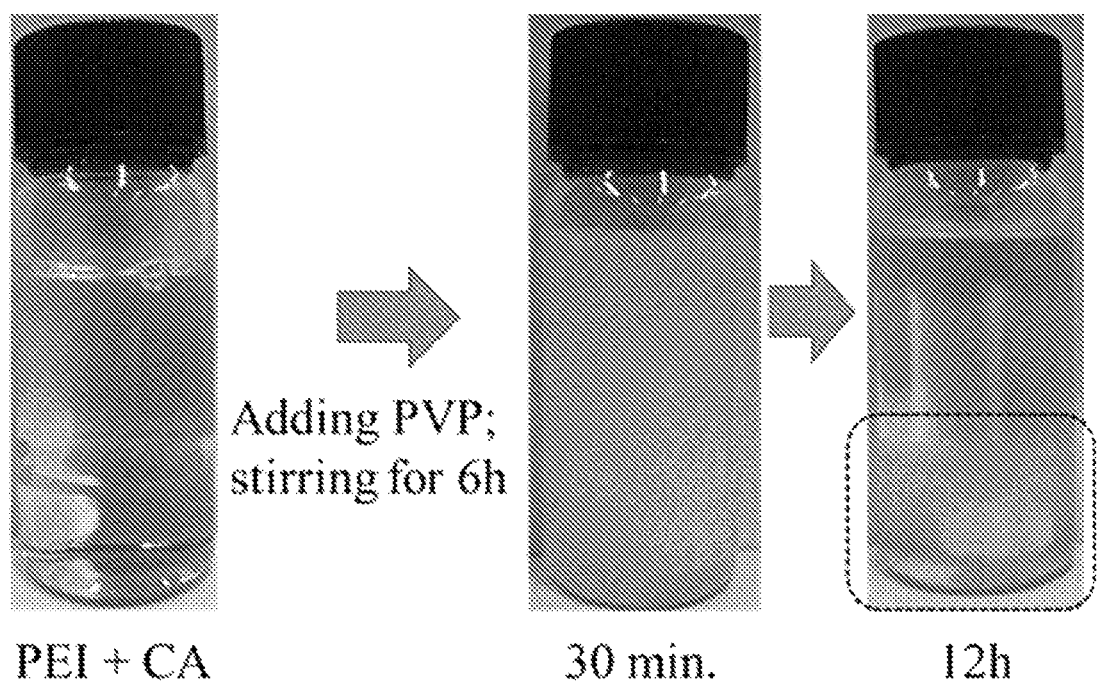
FIG. 5 shows an image illustrating the test results demonstrating the importance of synthetic order when preparing the PPC binder according to the present disclosure.

FIG. 5 shows an image illustrating the test results demonstrating the importance of synthetic order when preparing the PPC binder according to the present disclosure.

Referring to FIG. 5, it can be seen that when citric acid (CA), not PVP solution, is added first to the PEI solution and mixed, precipitation occurs due to the reaction between PEI and citric acid, as shown in the image of the left side. Then, after PVP is added, the mixture is agitated for 6 hours and allowed to stand, and then photographed after the lapse of 30 minutes and 12 hours. It can be seen that precipitate is formed clearly. Therefore, addition of citric acid to the PEI solution before adding PVP causes a change in the result of the reaction between PEI and PVP. This is because the terminal of PEI is charged with the proton of citric acid, while citric acid is added to the PEI solution and pH is changed into 7, a neutral state. Such reaction protects the reaction between PEI and PVP. This demonstrates the presence of chemical reaction between PEI and PVP at the initial stage before adding citric acid in the normal synthesis reaction.

Figure 6:
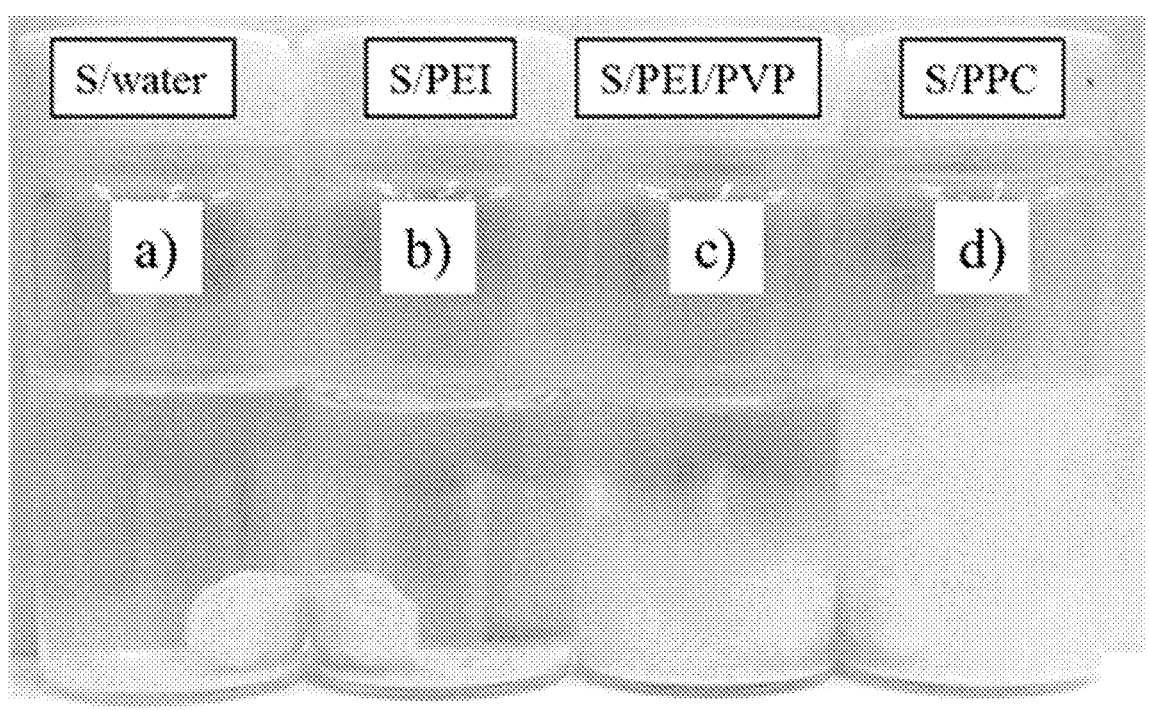
FIG. 6 shows an image illustrating the results of comparison of (a) distilled water, (b) Comparative Example 6 (PEI), (c) Comparative Example 1 (PEI/PVP) and (d) Example 3 (PPC) binder solutions, in terms of sulfur solubility.

FIG. 6 shows an image illustrating the results of comparison of (a) distilled water, (b) Comparative Example 6 (PEI), (c) Comparative Example 1 (PEI/PVP) and (d) Example 3 (PPC) binder solutions, in terms of sulfur solubility.

To each of distilled water, the PEI binder solution according to Comparative Example 6 (PEI), the PEI/PVP binder solution according to Comparative Example 1 and the PPC (1/6/1) binder solution according to Example 3, 50 mg of sulfur powder was introduced. The resultant solution was agitated at a speed of 500 rpm for 10-20 hours. After the solution was allowed to stand for 2 hours, it was photographed to observe the state of each solution.

Referring to FIG. 6, as can be seen from (a), sulfur functioning as a fundamental active material is precipitated totally while not being dissolved in water in a neutral state. However, as shown in (b) and (c), the binder solution containing PEI dissolved therein is basic, and thus sulfur powder is dissolved therein. When such a binder is applied to a cathode of a lithium-sulfur secondary battery, there is a serious problem of a loss of the active material caused by dissolution of the sulfur active material. In the PPC binder according to the present disclosure, it can be seen that sulfur powder is not dissolved in the PPC binder solution but precipitated by virtue of neutralization of the binder solution through the addition of the PPC binder. Therefore, when the PPC binder is used to manufacture a high-energy density sulfur cathode of a lithium-sulfur secondary battery, it is possible to ensure a safe system which is not reactive to the active material.

Figure 7A:
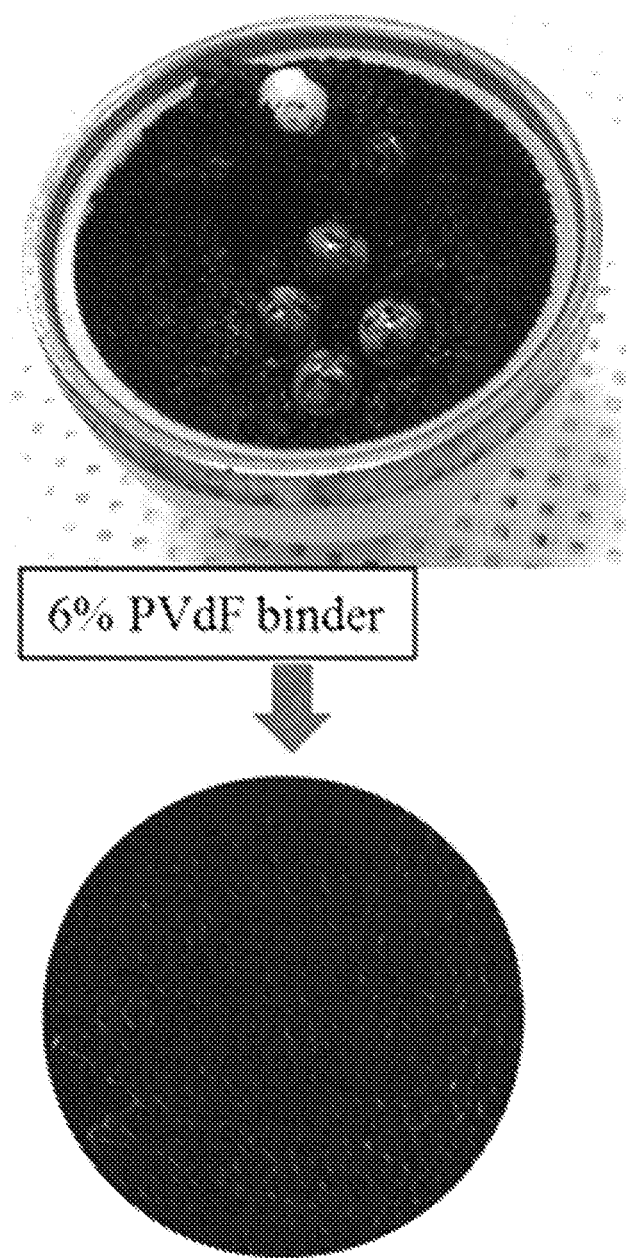
FIGS. 7A and 7B show images illustrating the appearance of the slurry prepared by using each of the PVdF binder prepared from Comparative Example 4 (FIG. 7A) and the PPC binder prepared from Example 1 (FIG. 7B), and the high-energy density sulfur cathode obtained by using the same.
Figure 7B:
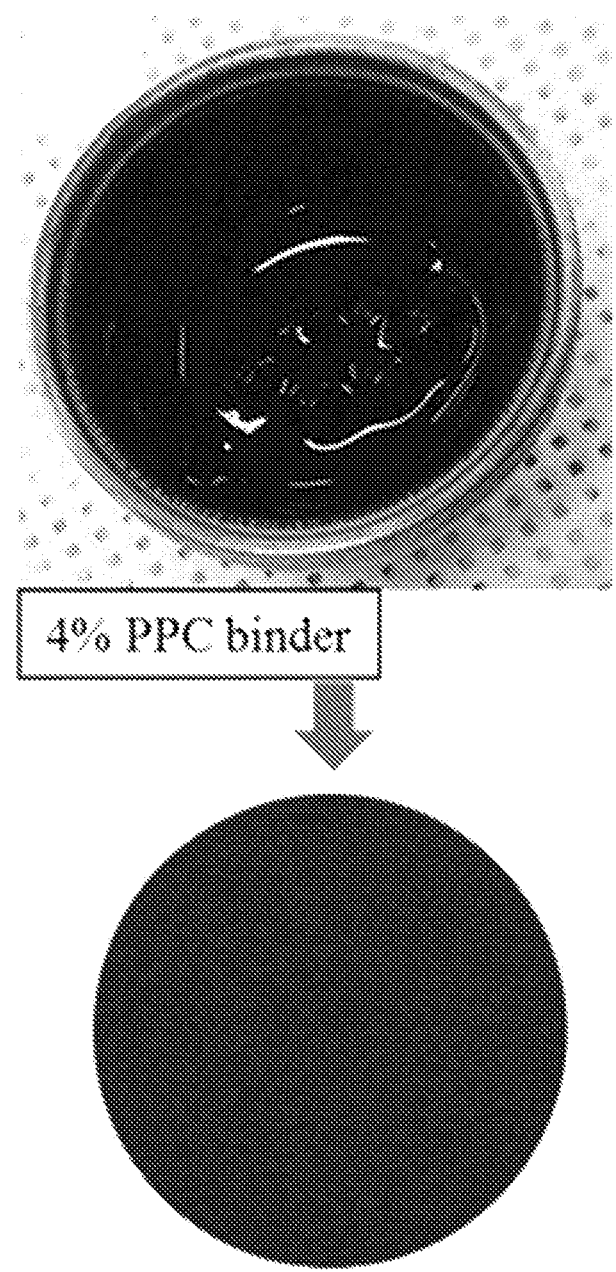

FIGS. 7A and 7B show images illustrating the appearance of the slurry prepared by using each of the PVdF binder prepared from Comparative Example 4 (FIG. 7A) and the PPC binder prepared from Example 1 (FIG. 7B), and the high-energy density sulfur cathode obtained by using the same. In each case, 6 parts by weight of PVdF and 4 parts by weight of PPC are introduced to 100 parts by weight of the slurry, and the slurry is cast onto an aluminum foil current collector with a doctor blade to obtain a high-energy density sulfur cathode.

Referring to FIGS. 7A and 7B, a difference in viscosity of slurry generated after the ball mill mixing step can be seen from the images of FIGS. 7A and 7B. In the case of the PPC binder, slurry having adequate viscosity is formed well even in an amount of 4 parts by weight. On the contrary, in the case of PVdF binder, slurry cannot be formed well even in an amount of 6 parts by weight. When a high-energy density sulfur cathode is manufactured by using the slurry, the cathode using the PVdF binder shows generation of a large amount of cracks and the cathode using the PPC binder shows a uniform surface state without generation of cracks. Therefore, it can be seen that when a carbon conductive material having a large specific surface area is used to obtain a cathode of a lithium-sulfur secondary battery, the PPC binder is more effective than the conventional PVdF binder.

Figure 8:
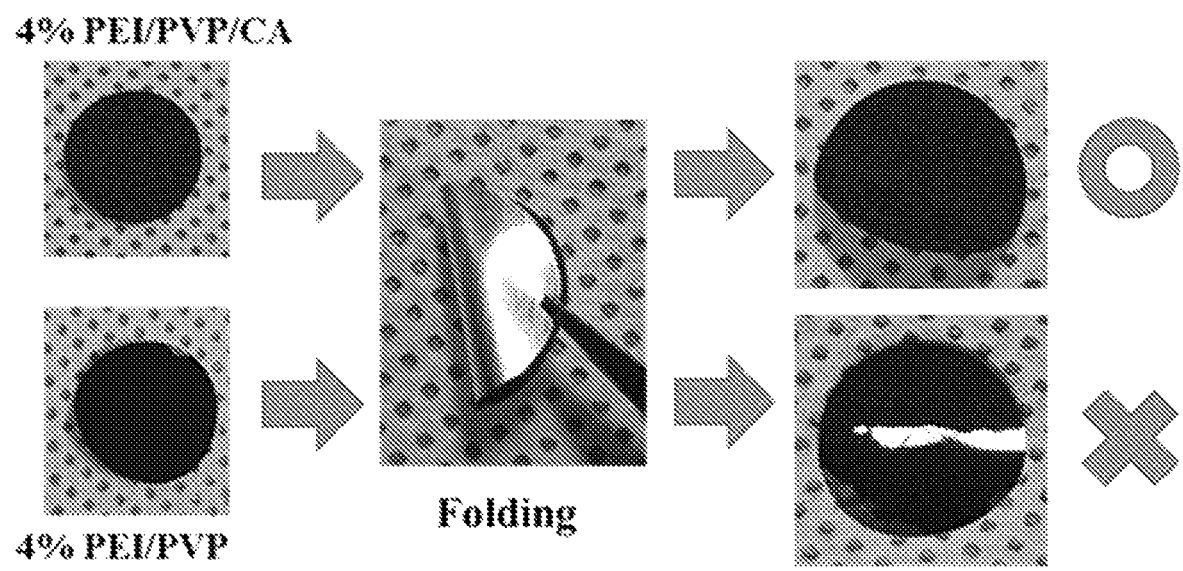
FIG. 8 shows an image illustrating the flexibility of each of the cathodes obtained by using the PPC binder prepared from Example 1 and the PEI/PVP binder prepared from Comparative Example 1.

FIG. 8 shows an image illustrating the flexibility of each of the cathodes obtained by using the PPC binder prepared from Example 1 and the PEI/PVP binder prepared from Comparative Example 1.

As can be seen from FIG. 8, the cathode using the PPC binder maintains its original state stably even after it is folded. On the contrary, the cathode using the PEI/PVP binder shows clear separation of the electrode material after it is folded. Thus, it can be seen that the PPC binder not only prevents corrosion of the aluminum current collector as mentioned above but also has improved adhesion.

Figure 9:
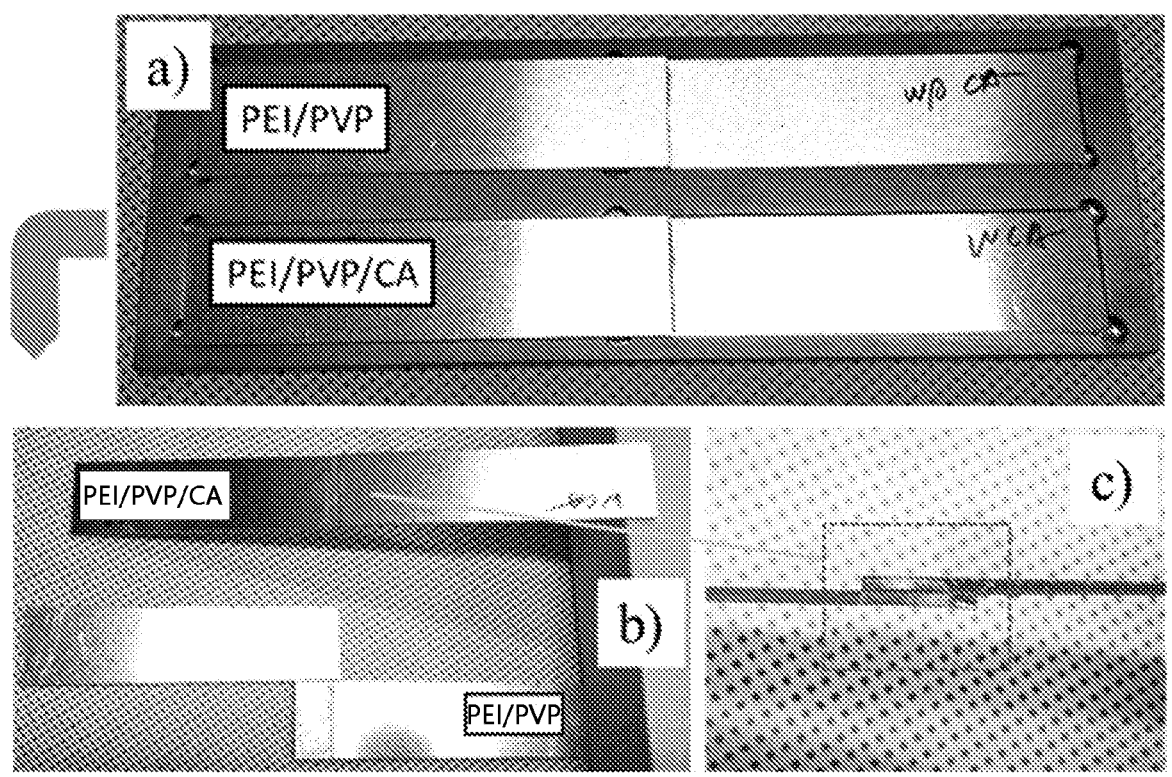
FIG. 9 shows an image illustrating the test results for adhesion of each of the PPC binder prepared from Example 3 and the PEI/PVP binder prepared from Comparative Example 1.

FIG. 9 shows an image illustrating the test results for adhesion of each of the PPC binder prepared from Example 3 and the PEI/PVP binder prepared from Comparative Example 1.

To determine the adhesion of each of the binders according to Example 3 and Comparative Example 1, an aluminum plate having a thickness of 1.6 mm was cut into a rectangular shape with a size of width×length of 101.6 mm×25.4 mm according to the ASTM D1002 standard. Next, 50 µL of each binder solution was applied to the surface between the two aluminum plates, placed in an oven at 100° C. for 15 minutes, and then cooled naturally to room temperature. The prepared specimen was tested for tensile stress by using the Instron 5567 Universal Testing Machine (UTM) to evaluate the adhesion of each binder.

As can be seen from FIG. 9, after adhering two aluminum plates by using each of the PPC binder and PEI/PVP binder, like (a), the two aluminum plates were wrung out from each other to compare the adhesion. Referring to the results of (b) and (c), the two aluminum plates adhered by the PPC binder maintained adhesion stably even after they were wrung out from each other.

Figure 10A:
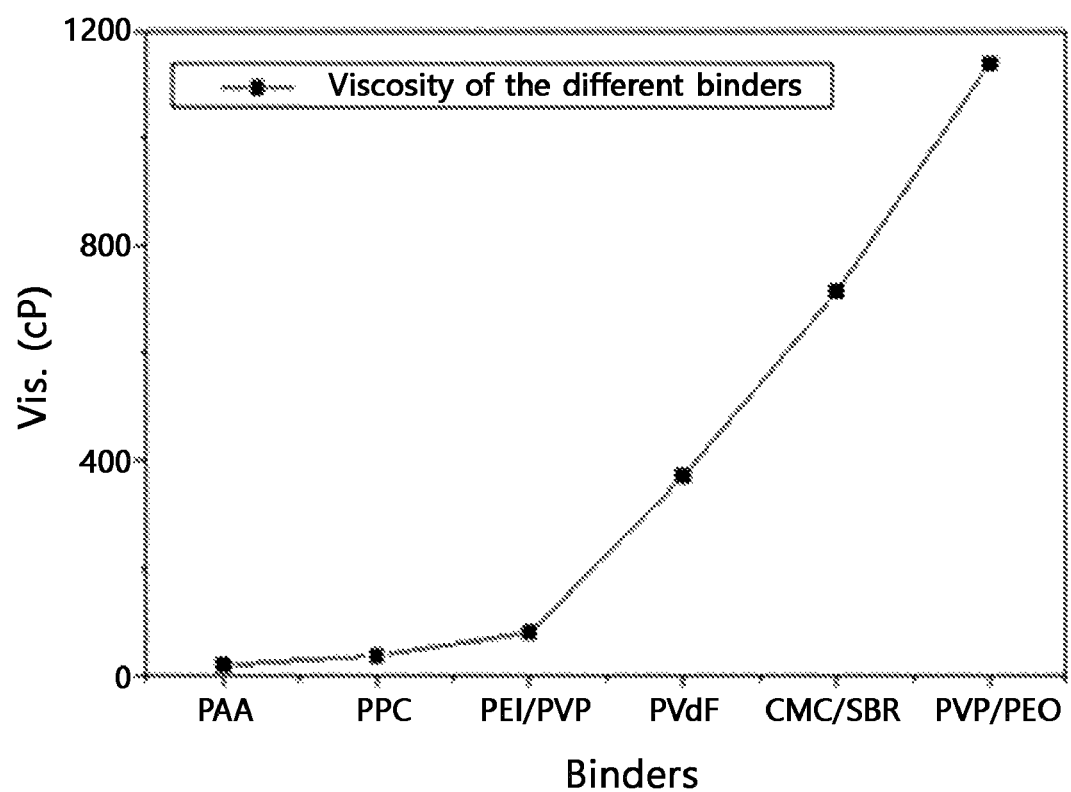
FIG. 10A shows a graph illustrating the viscosity of each of the PPC (1/6/1) binder prepared from Example 3, Comparative Example 1 (PEI/PVP), Comparative Example 2 (PVP/PEO), Comparative Example 3 (CMC/SBR), Comparative Example 4 (PAA) and Comparative Example 5 (PVdF) binders as determined through a viscometer apparatus.
Figure 10B:
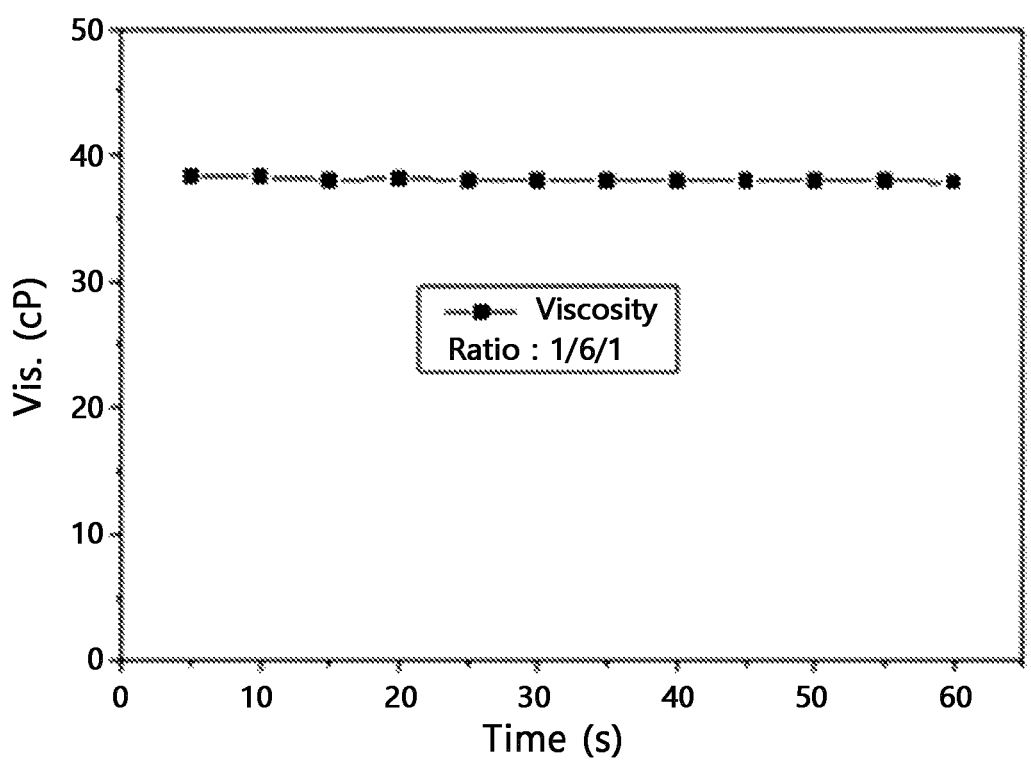
FIG. 10B shows a graph illustrating the results of viscosity of PPC (1/6/1) determined for 60 seconds at an interval of 5 seconds.

FIG. 10A shows a graph illustrating the viscosity of each of the PPC (1/6/1) binder prepared from Example 3, Comparative Example 1 (PEI/PVP), Comparative Example 2 (PVP/PEO), Comparative Example 3 (CMC/SBR), Comparative Example 4 (PAA) and Comparative Example 5 (PVdF) binders as determined through a viscometer apparatus; FIG. 10B shows a graph illustrating the results of viscosity of PPC (1/6/1) determined for 60 seconds at an interval of 5 seconds; and FIGS. 10C and 10D shows graphs illustrating variations in viscosity characteristics depending on agitation time of PEI and PVP ranging from 12 hours to 42 hours, when preparing the PEI/PVP (1/6) and PPC (1/6/1) binders.

Figure 10C:
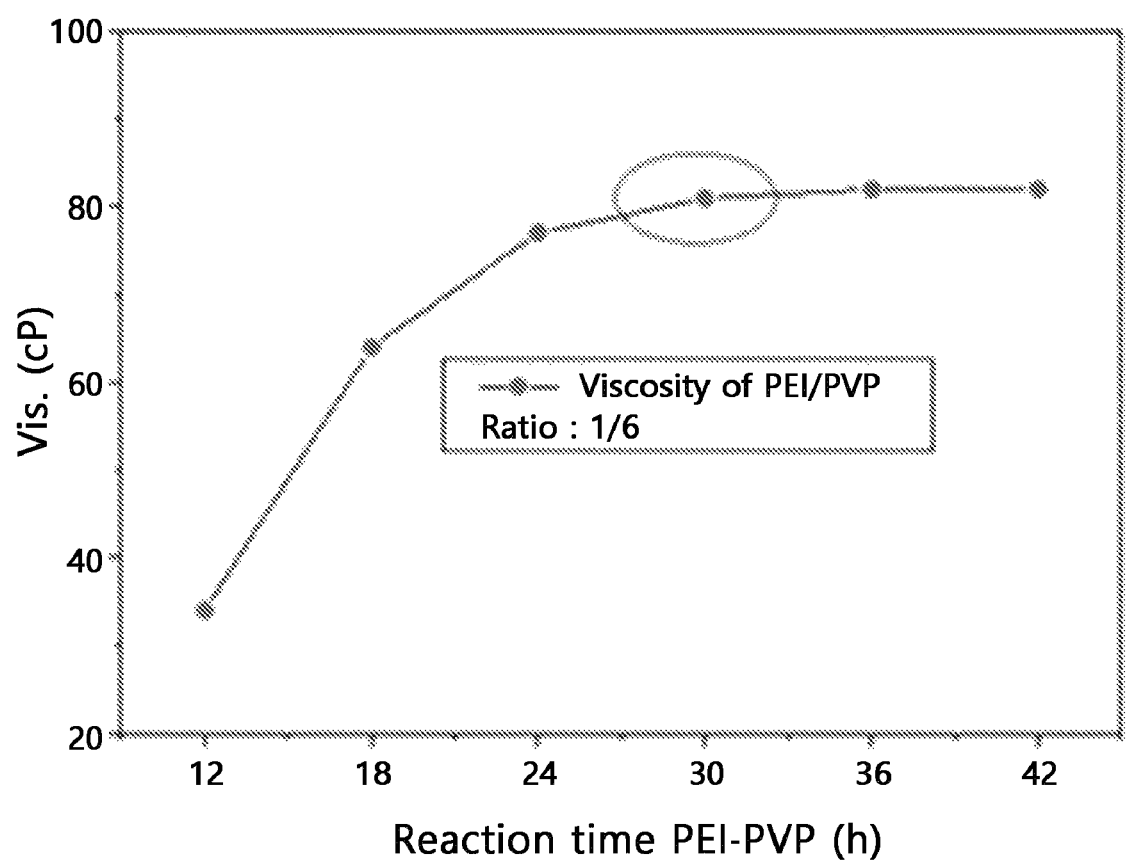
FIGS. 10C and 10D show graphs illustrating variations in viscosity characteristics depending on agitation time of PEI and PVP ranging from 12 hours to 42 hours, when preparing the PEI/PVP (1/6) and PPC (1/6/1) binders.
Figure 10D:
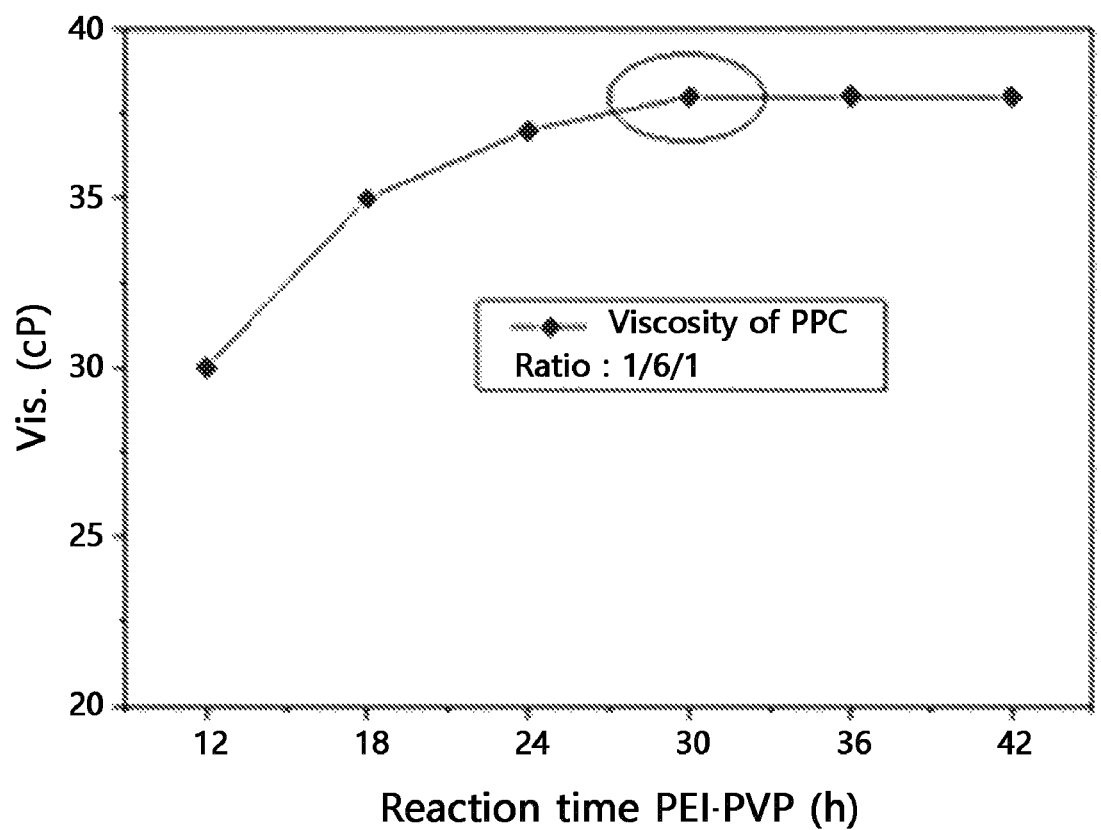

Referring to FIGS. 10A to 10D, in the results of FIG. 10A, the PVdF, CMC/SBR and PVP/PEO binders show higher viscosity as compared to PPC, PAA and PEI/PVP. Therefore, it can be seen that when manufacturing a high-energy density sulfur cathode of a lithium-sulfur secondary battery, such a highly viscous binder system is not suitable. The results of FIG. 10B show the viscosity of PPC (1/6/1) over 60 seconds at a recording interval of 5 seconds. Even after 60 seconds, it perfectly maintains its initial viscosity. Such fundamentally low viscosity and excellent viscosity-maintaining ability of the PPC binder allows electrode slurry to maintain the same low viscosity during the preparation and casting thereof, and thus plays an important role in manufacture of uniform electrodes. Particularly, it is possible to facilitate manufacture of a high-energy density sulfur cathode using an electrode material having a high specific surface area. In addition, FIGS. 10C and 10D show variations in viscosity characteristics depending on agitation time of PEI and PVP ranging from 12 hours to 42 hours, when preparing the PEI/PVP (1/6) and PPC (1/6/1) binders. Both of the binder systems show saturation and convergence of the viscosity level after an agitation time of about 30 hours. It is though that the above results are derived from the physicochemical interaction between PEI and PVP. Thus, it can be seen from the results of FIGS. 10A to 10D that preparation of the PPC (1/6/1) binder using an agitation time of 30 hours or less is favorable to the manufacture of a high-energy density sulfur cathode.

Figure 11:
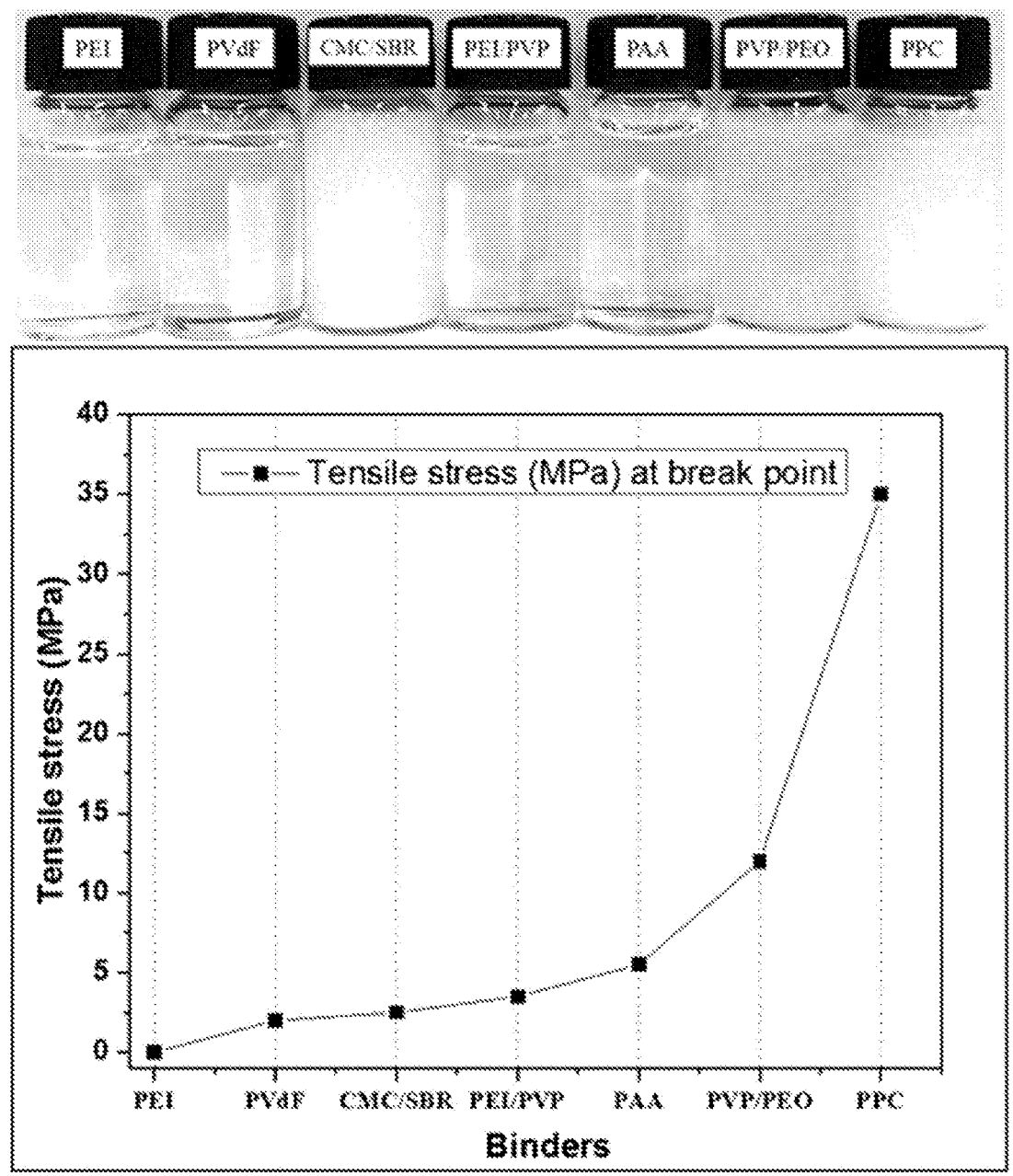
FIG. 11 is a graph illustrating the test results for the adhesion of each of the PPC (1/6/1) binder prepared from Example 3, Comparative Example 1 (PEI/PVP), Comparative Example 2 (PVP/PEO), Comparative Example 3 (CMC/SBR), Comparative Example 4 (PAA), Comparative Example 5 (PVdF) and Comparative Example 6 (PEI) binders at room temperature, as determined by measuring the tensile stress.

FIG. 11 is a graph illustrating the test results for the adhesion of each of the PPC (1/6/1) binder prepared from Example 3, Comparative Example 1 (PEI/PVP), Comparative Example 2 (PVP/PEO), Comparative Example 3 (CMC/SBR), Comparative Example 4 (PAA), Comparative Example 5 (PVdF) and Comparative Example 6 (PEI) binders at room temperature, as determined by measuring the tensile stress.

Referring to FIG. 11, it can be seen that the PPC binder shows the highest tensile stress characteristics, which suggests that the PPC binder has the highest adhesion. Therefore, it is possible to obtain a high-energy density sulfur cathode even in a smaller amount as compared to the other binders. The PEI/PVP binder has lower adhesion as compared to PAA and PVP/PEO binders. In addition, it is to be noted that the binder using PEI alone has little adhesion. Thus, it is difficult to use PEI alone as a binder material for forming an electrode.

Figure 12:
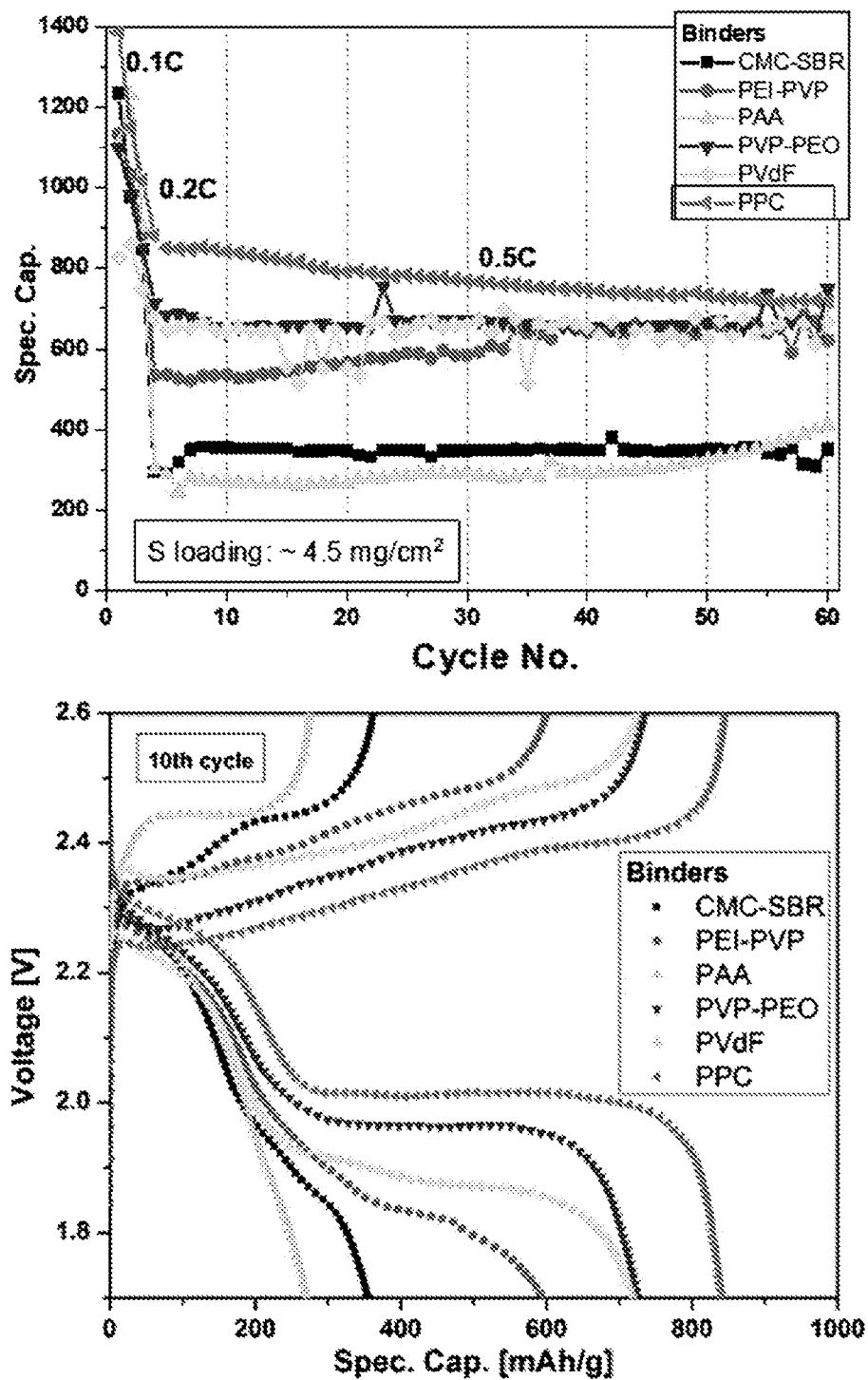
FIG. 12 is a graph illustrating (a) the results of electrochemical life characteristics and (b) the charge/discharge curve at the $10^{th}$ cycle for each of the lithium-sulfur secondary batteries using the sulfur cathodes having a high energy density of about 4.5 mg/cm$^2$ obtained by using the PPC (1/6/1) binder prepared from Example 3, Comparative Example 1 (PEI/PVP), Comparative Example 2 (PVP/PEO), Comparative Example 3 (CMC/SBR), Comparative Example 4 (PAA) and Comparative Example 5 (PVdF) binders.

FIG. 12 is a graph illustrating (a) the results of electrochemical life characteristics and (b) the charge/discharge curve at the $10^{th}$ cycle for each of the lithium-sulfur secondary batteries using the sulfur cathodes having a high energy density of about 4.5 mg/cm$^2$ obtained by using the PPC (1/6/1) binder prepared from Example 3, Comparative Example 1 (PEI/PVP), Comparative Example 2 (PVP/PEO), Comparative Example 3 (CMC/SBR), Comparative Example 4 (PAA) and Comparative Example 5 (PVdF) binders.

Referring to FIG. 12, after determining the life characteristics as shown in (a), the PPC binder system shows the highest capacity and stable life characteristics, and PAA and CMC/SBR binders show significantly low discharge capacity. Thus, it is thought that the PPC binder is the most suitable binder for a high-energy density sulfur cathode. After the comparison of the charge/discharge curve at the $10^{th}$ cycle in (b), a stable voltage profile is observed based on the lowest internal resistance characteristics, when the PPC binder is used. This demonstrates that the PPC binder is the best for the manufacture of a high-energy density sulfur cathode.

Figure 13:
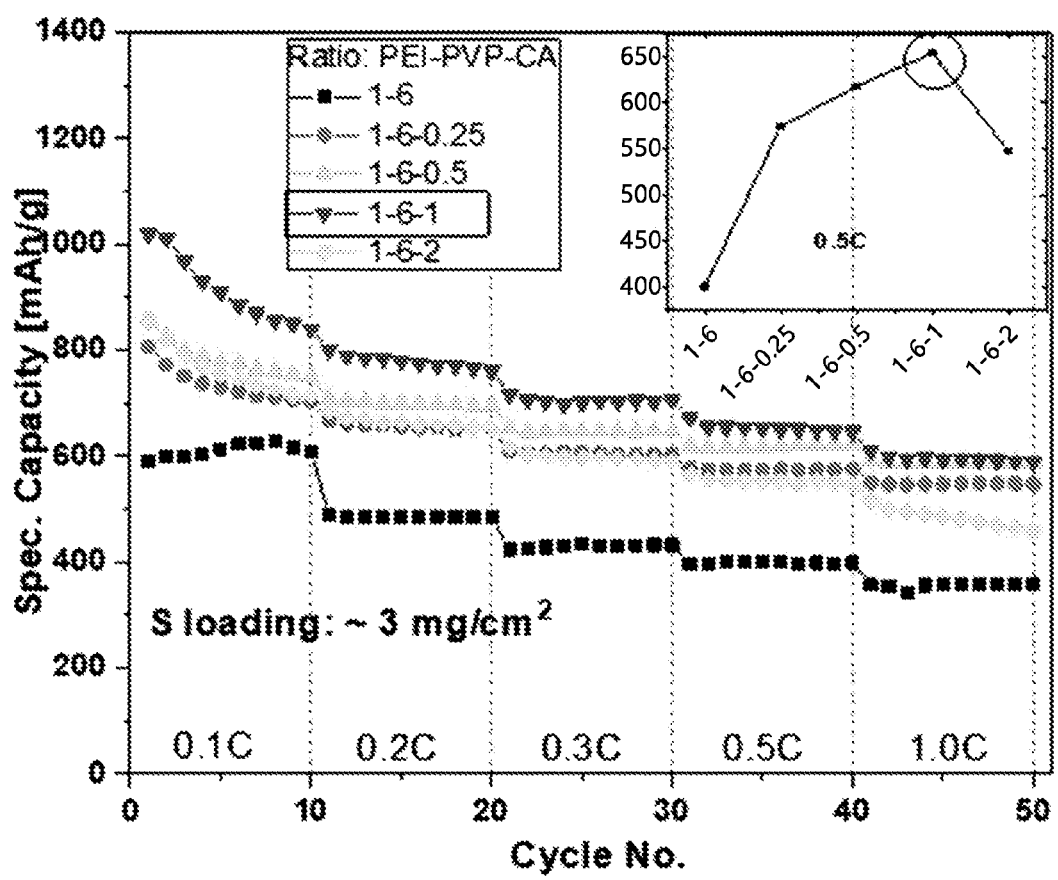
FIG. 13 is a graph illustrating a difference in the electrochemical rate capability depending on the weight ratio of PEI/PVP/citric acid of the PPC binders according to Examples 1-4 and Comparative Example 1.

FIG. 13 is a graph illustrating a difference in the electrochemical rate capability depending on the weight ratio of PEI/PVP/citric acid of the PPC binders according to Examples 1-4 and Comparative Example 1.

Referring to FIG. 13, even when PPC binders are prepared by varying the weight ratio of citric acid from 0.25 to 2 based on PEI/PVP (1/6), the PPC binder shows higher rate capability as compared to the PEI/PVP (1/6) binder. As the weight ratio of citric acid is increased, higher electrochemical characteristics are observed, and the PPC binder having a weight ratio of 1/6/1 shows the highest electrochemical characteristics. However, when the weight ratio of citric acid is further increased to 1/6/2, the electrochemical characteristics are degraded rapidly. Therefore, it can be seen that the optimum weight ratio of the PPC binder is 1/6/1.

Figure 14:
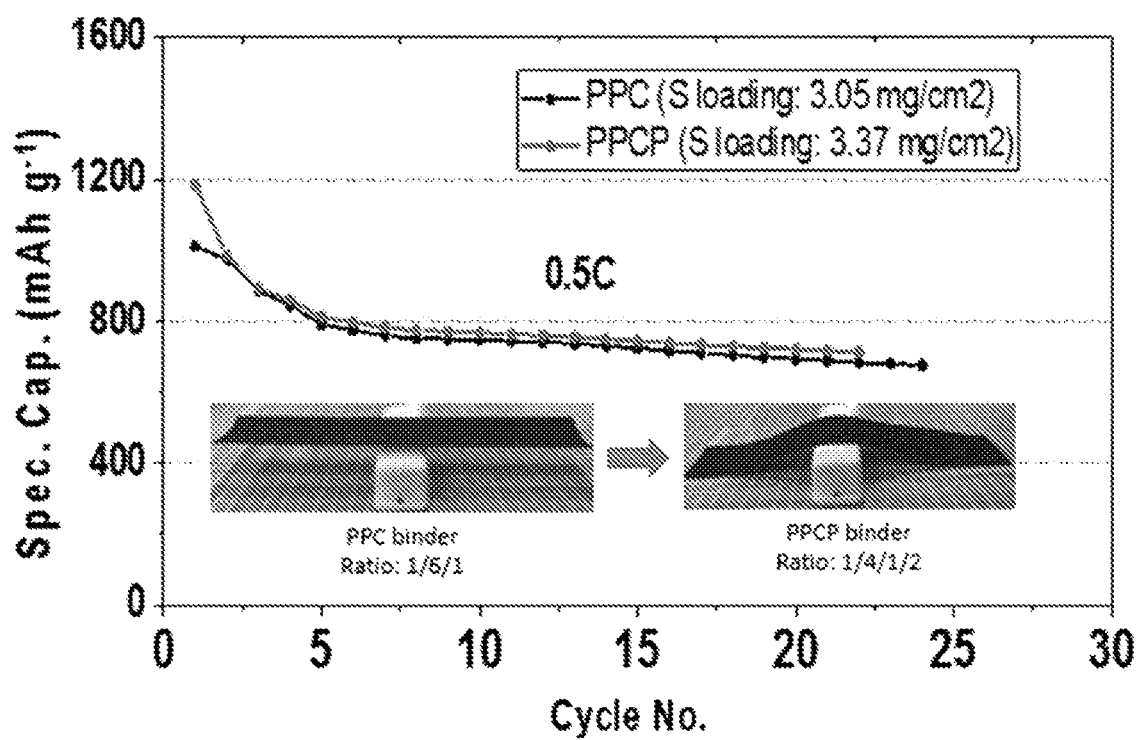
FIG. 14 shows a graph illustrating the electrochemical characteristics of each of the electrodes using the PPC binder prepared from Example 1 and the PPCP binder prepared from Example 5 and an image illustrating the appearance of each of the sulfur cathodes obtained by using the binders.

FIG. 14 shows a graph illustrating the electrochemical characteristics of each of the electrodes using the PPC binder prepared from Example 1 and the PPCP binder prepared from Example 5 and an image illustrating the appearance of each of the sulfur cathodes obtained by using the binders.

Referring to FIG. 14, it can be seen that addition of the PEO to the PPC binder provides higher flexibility while not adversely affecting the electrochemical characteristics of the electrode.

Figure 15:
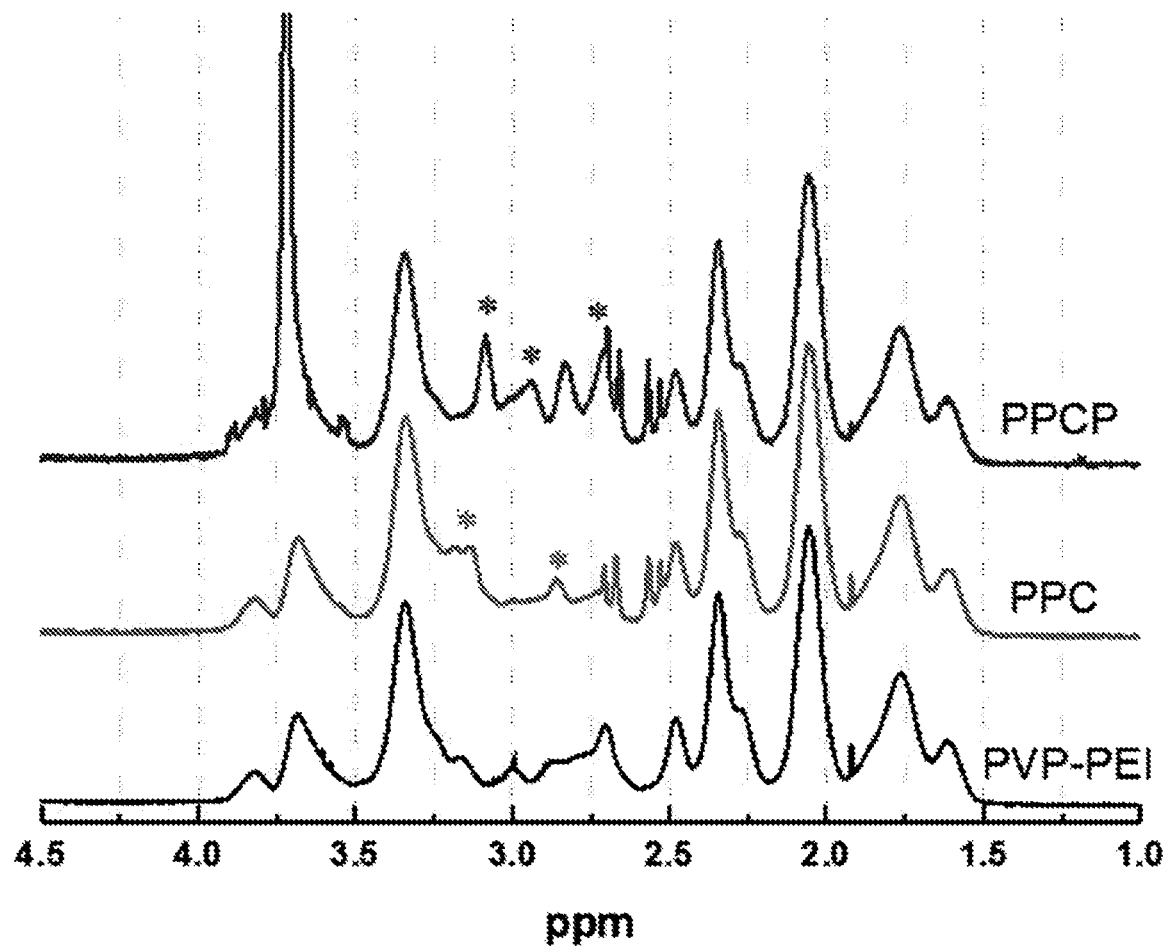
FIG. 15 shows a nuclear magnetic resonance spectroscopic graph of the PPC binder prepared from Example 1, the PPCP binder prepared from Example 5 and the PEI/PVP binder prepared from Comparative Example 1.

FIG. 15 shows a nuclear magnetic resonance spectroscopic graph of the PPC binder prepared from Example 1, the PPCP binder prepared from Example 5 and the PEI/PVP binder prepared from Comparative Example 1.

Referring to FIG. 15, new peaks appear when citric acid and PEO are added sequentially to the PEI/PVP binder, which demonstrates that a polymer binder having a novel structure is formed.

Figure 16:
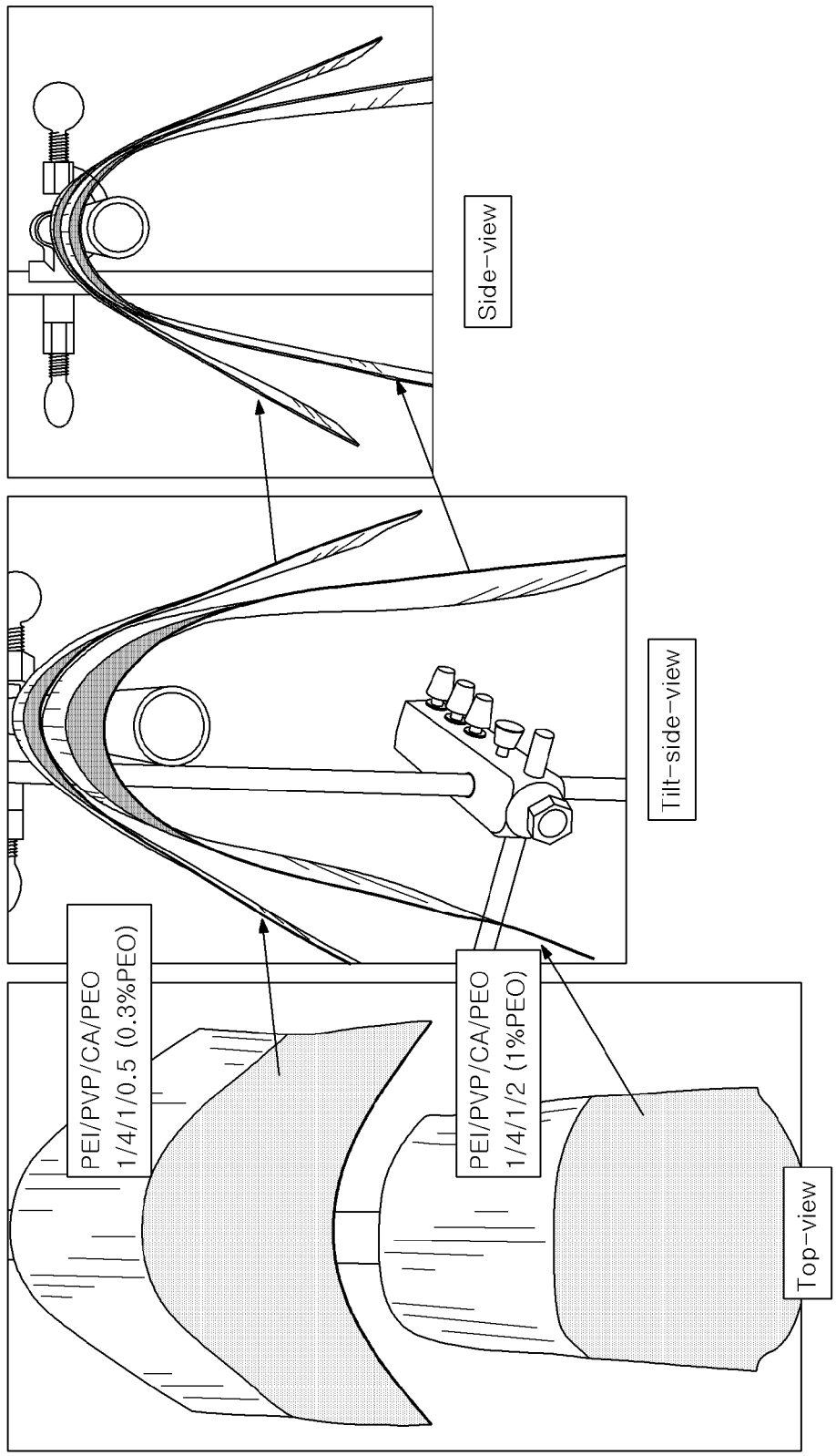
FIG. 16 shows an image illustrating the test results for the flexibility of the sulfur cathode obtained by using the PPCP binder prepared from Example 5.

FIG. 16 shows an image illustrating the test results for the flexibility of the sulfur cathode obtained by using the PPCP binder prepared from Example 5.

Referring to FIG. 16, it can be seen that when the ratio of the PPCP binder according to Example 5 is increased from 0.5 to 2, flexibility is increased significantly. This suggests that as the weight ratio of PEO is increased, flexibility is increased.

As a result, according to the present disclosure, it is possible to obtain an aqueous binder (PEI/PVP/CA, PPC) by adding citric acid to a mixed solution of polyethylene imine with polyvinyl pyrrolidone, and to apply the aqueous binder to a lithium-sulfur secondary battery having high discharge capacity, Coulombic efficiency and stable life characteristics through the improvement of adhesion capability even at a sulfur cathode with high energy density, inhibition of a shuttle reaction and inhibition of metal current collector corrosion.

What is claimed is:

1. An aqueous binder for a lithium-sulfur secondary battery, comprising polyethylene imine, polyvinyl pyrrolidone and citric acid.

2. The aqueous binder for a lithium-sulfur secondary battery according to claim 1, wherein polyethylene imine, polyvinyl pyrrolidone and citric acid are used at a weight ratio of 1:5.5-6.5:0.25-2.

3. The aqueous binder for a lithium-sulfur secondary battery according to claim 1, which further comprises polyethylene oxide.

4. The aqueous binder for a lithium-sulfur secondary battery according to claim 3, wherein polyethylene imine, polyvinyl pyrrolidone, citric acid and polyethylene oxide are used at a weight ratio of 1:4-6:0.25-1:0.5-2.5.

5. The aqueous binder for a lithium-sulfur secondary battery according to claim 1, wherein the NMR spectrum has peaks in a range of 3.0-3.25 ppm and 2.70-3.1 ppm.

6. A sulfur cathode material for a lithium-sulfur secondary battery, comprising the aqueous binder for a lithium-sulfur secondary battery as defined in claim 1, a sulfur-carbon composite and a conductive material.

7. The sulfur cathode material for a lithium-sulfur secondary battery according to claim 6, wherein the aqueous binder for a lithium-sulfur secondary battery is used in an amount of 1-20 parts by weight based on 100 parts by weight of the sulfur cathode material.

8. A lithium-sulfur secondary battery which comprises a cathode comprising the cathode material for a lithium-sulfur secondary battery as defined in claim 6, a lithium metal anode, a separator and an electrolyte.

9. The lithium-sulfur secondary battery according to claim 8,
   wherein the aqueous binder for a lithium-sulfur secondary battery includes polyethylene imine, polyvinyl pyrrolidone and citric acid at a weight ratio of 1:5.8-6.2:0.8-1.2;
   the aqueous binder for a lithium-sulfur secondary battery is used in an amount of 4-6 parts by weight based on 100 parts by weight of the sulfur cathode material;
   the sulfur-carbon composite is a composite of sulfur/multi-walled carbon nanotubes; and
   the electrolyte is a solution containing 0.8-1.2M of LiTFSI as a lithium salt and 0.1-0.5M of LiNO$_3$ as an additive, dissolved in a solvent containing dimethoxyethane (DME) and dioxolane (DOL) at a volume ratio of 1:0.8-1.2.

\* \* \* \* \*